US012263570B2

(12) United States Patent
Norquist et al.

(10) Patent No.: US 12,263,570 B2
(45) Date of Patent: Apr. 1, 2025

(54) HYDRAULIC TOOLS

(71) Applicant: Enerpac Tool Group Corp., Menomonee Falls, WI (US)

(72) Inventors: Eric D. Norquist, Milwaukee, WI (US); Ben Gall, Menomonee Falls, WI (US); Celia Sánchez Santero, Aranjuez (ES); Daniel Escudero Alonso, Madrid (ES); Elizabeth M. Neelsen, St. Francis, WI (US); Kyle M. Harvey, Waukesha, WI (US); Nathaniel Olbrich, Menomonee Falls, WI (US)

(73) Assignee: Enerpac Tool Group Corp.

( * ) Notice: Subject to any disclaimer, the term of this patent is extended or adjusted under 35 U.S.C. 154(b) by 0 days.

(21) Appl. No.: 18/205,041

(22) Filed: Jun. 2, 2023

(65) Prior Publication Data

US 2023/0390913 A1 Dec. 7, 2023

Related U.S. Application Data

(60) Provisional application No. 63/349,542, filed on Jun. 6, 2022.

(51) Int. Cl.
*B25F 5/00* (2006.01)
*B23D 29/00* (2006.01)
(Continued)

(52) U.S. Cl.
CPC ................ *B25F 5/005* (2013.01); *B25F 5/02* (2013.01); *F04B 17/03* (2013.01); *F15B 15/18* (2013.01);
(Continued)

(58) Field of Classification Search
CPC .............................. B25F 5/005; B23D 29/002
See application file for complete search history.

(56) References Cited

U.S. PATENT DOCUMENTS 9,808,851 B2 * 11/2017 Thorson .................. F16H 25/20
10,894,310 B2 1/2021 Cannaliato
11,213,875 B2 * 1/2022 Ruch ....................... B25B 27/10
(Continued)

FOREIGN PATENT DOCUMENTS

AT 525877 B1 * 9/2023
AU 2016223762 A1 * 9/2017 ............. B21D 28/34
(Continued)

OTHER PUBLICATIONS

EP23177630.3, European Search Report dated Feb. 7, 2024, 12 pages.
(Continued)

*Primary Examiner* — Lucas E. A. Palmer
(74) *Attorney, Agent, or Firm* — Andrus Intellectual Property Law, LLP

(57) ABSTRACT

A hydraulic tool for working on a workpiece. A housing is configured for holding. A motor is positioned in the housing. A battery is supported by the housing and operable to supply power to the motor. A drive mechanism is supported by the housing and includes a cylinder, a piston moveably supported in the cylinder, and a pump powered by the motor and operable to supply hydraulic fluid to the cylinder to move the piston relative to the cylinder. A jaw member is supported by the housing and configured to engage with the workpiece. A spindle is operatively coupled to the drive mechanism such that operating the drive mechanism moves the spindle relative to the jaw member to work on the workpiece.

20 Claims, 30 Drawing Sheets

(51) Int. Cl.
*B25B 27/06* (2006.01)
*B25F 5/02* (2006.01)
*F04B 17/03* (2006.01)
*F15B 15/18* (2006.01)

(52) U.S. Cl.
CPC .......... *B23D 29/002* (2013.01); *B23D 29/007* (2013.01); *B25B 27/064* (2013.01)

(56) References Cited

U.S. PATENT DOCUMENTS

| | | | | |
|---|---|---|---|---|
| 11,236,849 | B2* | 2/2022 | Besser | F16L 13/141 |
| 2006/0272381 | A1* | 12/2006 | Ayer | B25B 27/10 72/453.16 |
| 2013/0264085 | A1* | 10/2013 | Ciotti | B25F 5/005 173/29 |
| 2017/0035643 | A1 | 2/2017 | Workman et al. | |
| 2019/0224823 | A1* | 7/2019 | Ruch | B23D 29/002 |
| 2020/0017343 | A1 | 1/2020 | Leibinger | |

FOREIGN PATENT DOCUMENTS

| | | | | | |
|---|---|---|---|---|---|
| CN | 207155682 | U | * | 3/2018 | |
| CN | 108027026 | A | * | 5/2018 | A62B 3/005 |
| CN | 208358699 | U | * | 1/2019 | |
| CN | 110552843 | A | * | 12/2019 | |
| DE | 20206000 | U1 | | 8/2002 | |
| DE | 102018102162 | A1 | * | 4/2019 | B25F 5/00 |
| EP | 4006382 | A1 | * | 6/2022 | B23D 29/00 |
| JP | 2014521523 | A | * | 8/2014 | |
| WO | WO-2016189303 | A1 | * | 12/2016 | B23D 29/007 |
| WO | WO-2020069696 | A1 | * | 4/2020 | |
| WO | 2021069587 | A1 | | 4/2021 | |

OTHER PUBLICATIONS

Unpublished U.S. Appl. No. 18/140,876, filed Apr. 28, 2023 by Matthiew John Schleis.

* cited by examiner

FIG. 1A
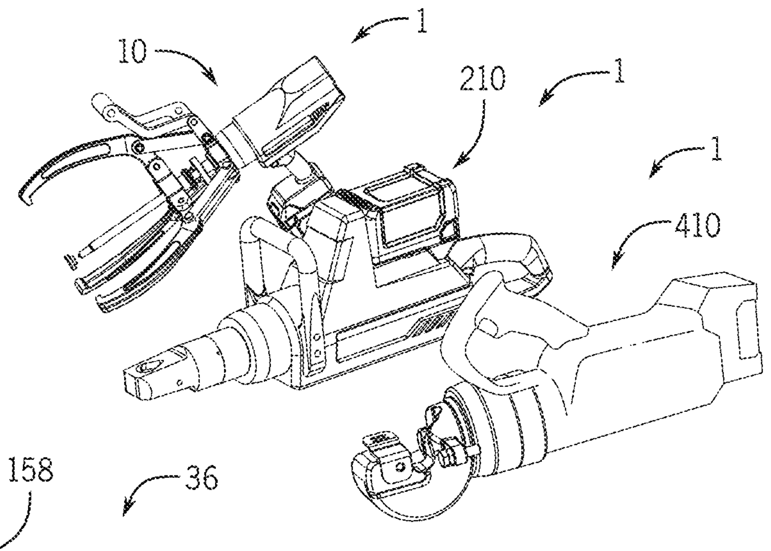
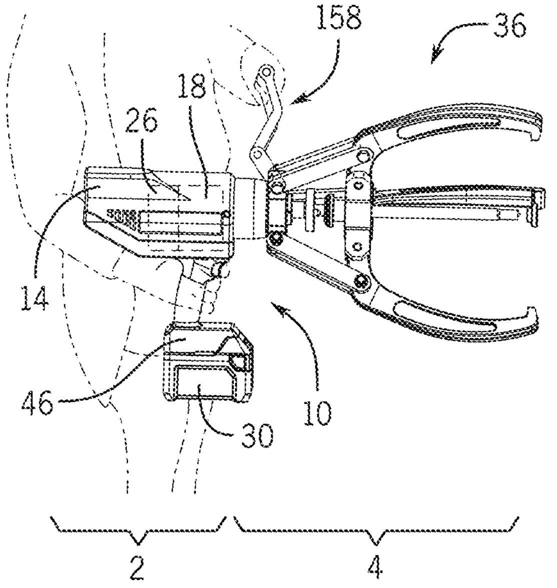
FIG. 1B
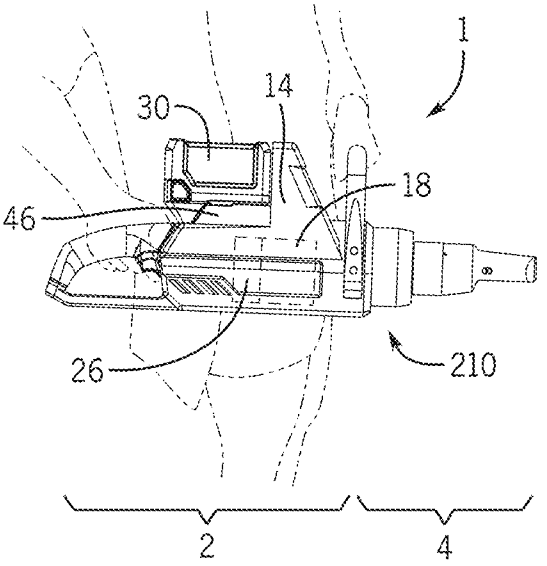
FIG. 1C
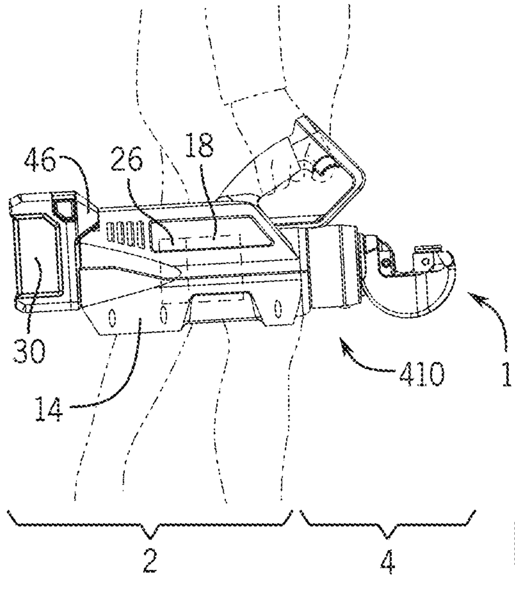
FIG. 1D

HYDRAULIC TOOLS

CROSS REFERENCE TO RELATED APPLICATION

This application claims the benefit of U.S. Provisional Patent Application No. 63/349,542, filed Jun. 6, 2022, which is incorporated herein by reference in its entirety.

FIELD

The present disclosure generally relates to hydraulic tools, and more particularly to battery powered hydraulic tools, such as a bearing puller, a nut splitter, or a strand cutter.

BACKGROUND

The following are incorporated herein by reference in entirety.

U.S. Patent Application Publication No. 2020/0173430 discloses a self-contained pump system for supplying pressurized fluid to a remote actuator includes a handle portion adapted to be grasped by a user. The pump system also includes a brushless DC motor and a battery that has a nominal voltage of at least 60 V. The battery is operable to supply power to the motor. A 3-stage pump assembly is driven by the motor and operable to discharge hydraulic fluid that has a pressure and a flow rate.

U.S. Patent Application Publication No. 2017/0356438 discloses a fluid pump system including a housing, a motor, a fan, and a fluid conduit. The housing includes a wall having a first end and a second end, and the housing defining a first axis extending between the first end and the second end. The wall extends at least partially around the first axis and at least partially encloses a chamber. The motor is at least partially positioned within the chamber. The fan is positioned proximate the first end, and the fan generates air flow through the chamber. The fluid conduit is configured to be in fluid communication with a fluid reservoir, and at least a portion of the fluid conduit is positioned within the chamber.

U.S. patent application Ser. No. 18/140,876 discloses a cylinder assembly having a housing, a pump supported within the housing, a motor supported within the housing and operable to power the pump, and a power source supported by the housing and operable to supply power to the motor. A cylinder has a first end, an opposite second end, and a sidewall extending therebetween. A piston is movably supported by the cylinder, the pump being operable to supply hydraulic fluid to the cylinder to move the piston relative to the cylinder at least from a retracted position to an advanced position. A frame is coupled to the sidewall of the cylinder and supporting the pump and the motor.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

One aspect according to the present disclosure generally relates to a hydraulic tool for working on a workpiece. A housing is configured for holding. A motor is positioned in the housing. A battery is supported by the housing and operable to supply power to the motor. A drive mechanism is supported by the housing and includes a cylinder, a piston moveably supported in the cylinder, and a pump powered by the motor and operable to supply hydraulic fluid to the cylinder to move the piston relative to the cylinder. A jaw member is supported by the housing and configured to engage with the workpiece. A spindle is operatively coupled to the drive mechanism such that operating the drive mechanism moves the spindle relative to the jaw member to work on the workpiece.

In certain examples, the spindle is coupled to the piston.

In certain examples, operating the drive mechanism causes the piston to push the spindle while the jaw member remains stationary.

In certain examples, the jaw member includes two jaw members each extending between a first end supported by the housing and a second end for engaging the workpiece, and wherein a distance between the second ends is adjustable to accommodate different configurations for the workpiece. In other examples, the drive mechanism moves the spindle in an axial direction, and wherein the distance between the second ends of the two jaw members are adjustable in a radial direction that is perpendicular to the axial direction. In other examples, the two jaw members are pivotally coupled to the housing, and wherein pivoting the two jaw members adjusts the distance between the second ends thereof.

In certain examples, the drive mechanism moves the spindle in an axial direction, and wherein the axial position of the spindle relative to the piston is adjustable to accommodate different configurations for the workpiece. In other examples, the housing extends in the axial direction between a front and a back, wherein the jaw member is supported closer to the front than to the back of the housing, and wherein the spindle extends out the back of the housing for adjusting the axial position of the spindle relative to the piston. In other examples, the spindle is threadingly coupled to the piston. In other examples, a sleeve is moveable by the piston, and wherein the spindle telescopes relative to the sleeve to adjust the axial position of the spindle relative to the piston.

In certain examples, the hydraulic tool further includes a hollow member through which the spindle extends, wherein the hollow member is supported by the housing, and wherein the jaw member is supported on an outer surface of the hollow member. In other examples, the jaw member is pivotably supported on the outer surface of the hollow member via a first collar, further comprising a second collar that is supported on an outer surface of the first collar, and further comprising a linkage that couples the jaw member to the second collar such that adjusting an axial position of the second collar along the hollow member pivots the jaw member to accommodate for different configurations of the workpiece. In other examples, a nut engages with threads on the outer surface of the hollow member, wherein axial moving the nut along the threads of the hollow member adjusts the position of the collar to pivot the jaw member. In other examples, the jaw member freely rotates about the outer surface of the hollow member. In other examples, the jaw member is pivotably supported on the outer surface of the hollow member via a first collar, wherein an axial position of the collar along the outer surface of the hollow member is fixed.

In certain examples, the jaw member is at least three jaw members and the hydraulic tool is a bearing puller.

In certain examples, the hydraulic fluid remains inside the housing when being supplied from the pump to the piston.

In certain examples, the housing includes a pistol grip configured to be held by the operator, and further comprising a switch supported operable by the operator to operate the drive mechanism.

In certain examples, the piston is moveable along a piston axis, wherein the spindle extends along a spindle axis, and wherein the piston axis is substantially coaxial with the spindle axis.

In certain examples, the pump comprises a block supporting a rotating pump shaft and a reciprocating pump piston, whereby the rotation of the pump shaft causing reciprocation of the pump piston transfers the hydraulic fluid to the cylinder.

It should be recognized that the different aspects described throughout this disclosure may be combined in different manners, including those than expressly disclosed in the provided examples, while still constituting an invention accord to the present disclosure.

Various other features, objects and advantages of the disclosure will be made apparent from the following description taken together with the drawings.

BRIEF DESCRIPTION OF THE DRAWINGS

FIGS. 1A-1D are views of hydraulic tools, such as a puller, a nut splitter, and a cutter, respectively.

DETAILED DESCRIPTION

Figure 2:
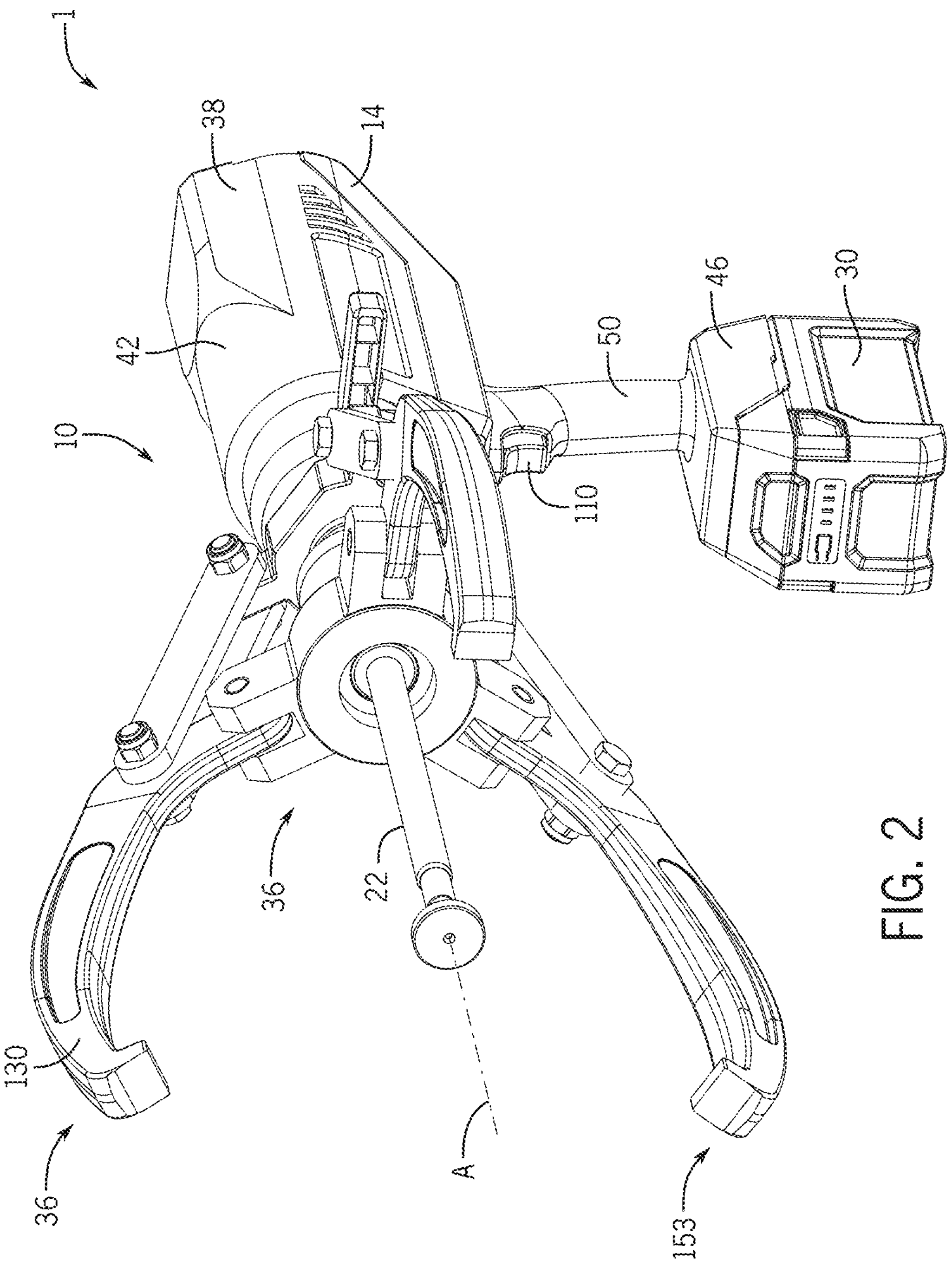
FIG. 2 is a front perspective view of the puller shown in FIGS. 1A-1B without an auxiliary handle.

Hydraulic tools, such as hydraulic bearing pullers, nut splitters, strand cutters, etc., use pressurized fluid to apply large forces (e.g., pulling forces to a bearing, pushing forces to split a nut or cut a strand, etc.). In particular, application of the pressurized fluid to a piston drives a tool element (e.g., a spindle, a cutting member, etc.) to apply a force. Such hydraulic tools are used in installation, operation and maintenance applications in many industries including, for example, wind power equipment, heavy equipment, oil and gas pipelines, etc.

A hydraulic tool is usually driven by a separate motor-driven pump supplying hydraulic fluid through a hose connected to the tool. The separate pump may require two operators to perform an operation—one to operate the pump, and the other to hold or operate the tool. Also, the operator is required to transport the pump, hoses, etc. to/from and around a work site. Additionally, access to electrical power or hydraulics is required to drive the pump and thereby the separate tool.

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

FIGS. 1A-1D illustrate different examples of hydraulic tools 1 according to the present disclosure, specifically a hydraulic puller 10, a hydraulic nut splitter 210, and a hydraulic cutter 410. The back ends 2 of the different hydraulic tools 1 may share similar components, which are thus labeled with like reference numbers for the sake of brevity. The back ends 2 include a housing 14 configured to be held by the operator. As shown in FIGS. 1A-1D, the housings 14 and the hydraulic tools 1 more generally may be configured to be held in different manners depending on how each of the hydraulic tools 1 is weighted and used during operation. Additional discussion of handles and the like is provided below.

Figure 3:
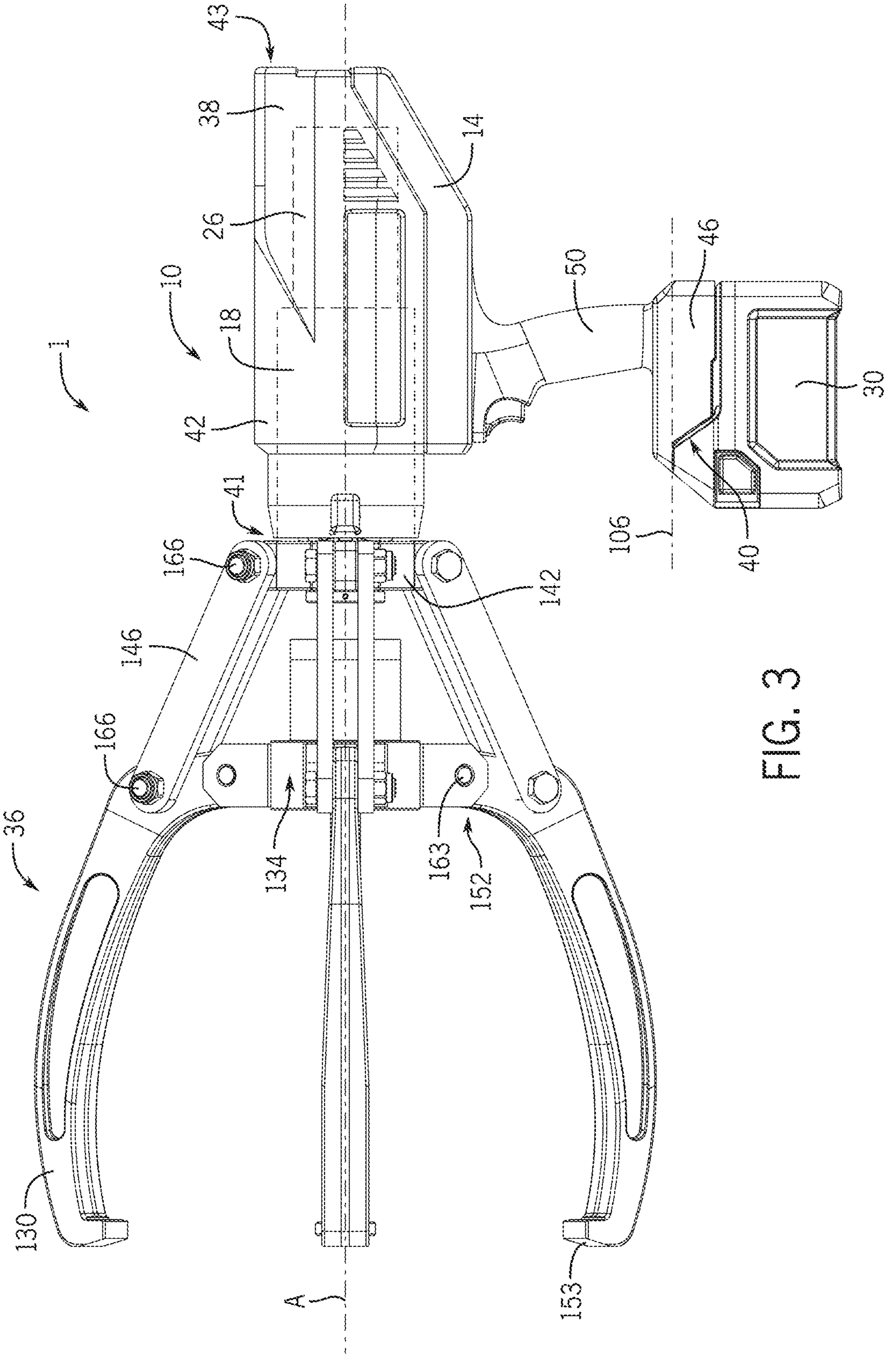
FIG. 3 is a side view of the puller of FIG. 2.

Each of the hydraulic tools 1 further includes a motor 26 positioned within the housing 14, along with a battery pack interface 46 configured to be electrically connected with a battery pack 30 (also referred to as simply a battery) to supply power to the motor 26. A hydraulic drive mechanism (also referred to as a drive mechanism 18) is also supported by the housing 14, which extends in an axial direction between a front 41 and a back 43 (FIG. 3). As is discussed further below, the drive mechanisms 18 include a cylinder, a piston moveably supported in the cylinder, and a pump powered by the motor 26 that is operable to supply hydraulic fluid to the cylinder to move the piston relative to the cylinder. The movement of the piston then causes some movement in the front end 4 of the various hydraulic tools 1 to work on a workpiece. By way of example, the workpiece may be a bearing, a gear, a sprocket, a wheel, etc. in the case of a hydraulic puller 10, a nut in the case of a hydraulic nut splitter 210, or a cable strand, wire rope, etc. in the case of a hydraulic cutter 410. In certain examples, the front end 4 may be similar to the front ends of tools presently known in the art. However, as least some of the front ends 4 disclosed herein are distinct from those known in the art, being developed by the present inventors to provide additional functionality, flexibility, and/or other advantages.

Figure 4:
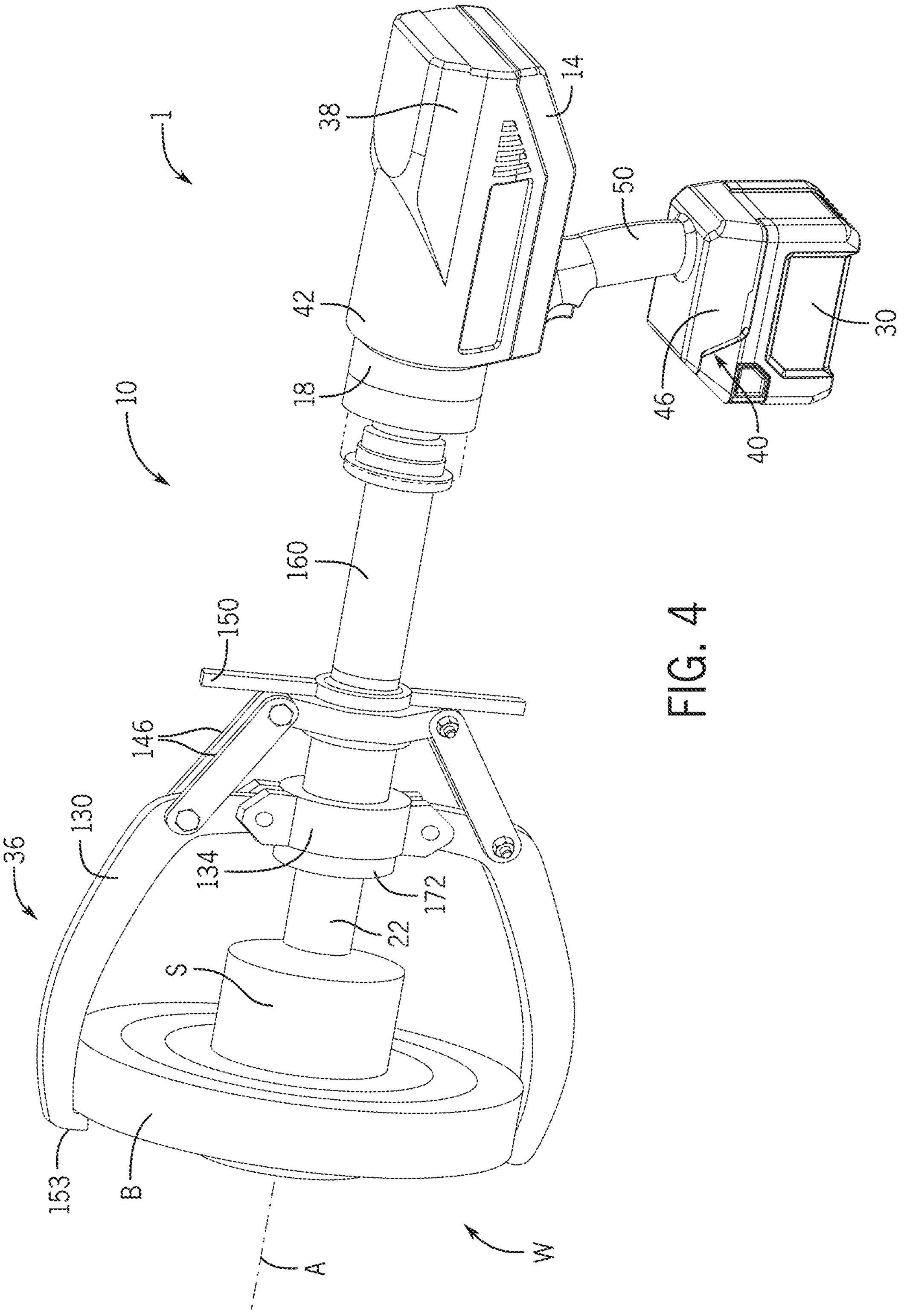
FIG. 4 is a rear perspective view of another puller.

With reference to FIGS. 2-4, additional details are now provided for specifically pullers 10 according to the present disclosure. The puller 10 of FIGS. 2 and 3 may be same as that of FIGS. 1A-1B (shown without the auxiliary handle 158), whereas FIG. 4 shows another example of a puller 10. It should be recognized that some of these components and features are also applicable to other types of hydraulic tools, which thus may not be separately described for these other hydraulic tools for the sake of brevity.

The pullers 10 are configured for removing shaft-mounted parts (e.g., a bearing B, a gear, a sprocket, a wheel, etc. from a shaft S as shown for the workpiece W in FIG. 4). In particular, the drive mechanism 18 of the puller 10 is configured for driving a spindle 22 along an axis A in the axial direction. As is discussed further below, the spindle 22 is moved via the drive mechanism 18, which is powered via the battery 30 connected to the battery pack interface 46. A handle portion 50 (here resembling a pistol grip style handle) is configured to be gripped by an operator to control operation of the puller 10. A motor housing portion 38 of the housing 14 supports the motor 26 and a drive mechanism portion 42 of the housing 14 supports the drive mechanism 18. The illustrated drive mechanism portion 42 is between the motor housing portion 38 and a jaw assembly 36. The handle portion 50 extends from the drive mechanism portion 42 proximate the motor housing portion 38.

An actuator or trigger 110 for operating the puller 10 is provided on the handle portion 50 and controls operation of the motor 26 (e.g., actuating a switch via squeezing the trigger 110 causes operation of the hydraulic drive mechanism 18). Electronic control and monitoring circuitry (e.g., including an electronic processor, not shown) are operable to control and/or monitor various functions and operations of the puller 10.*s*

Figure 7:
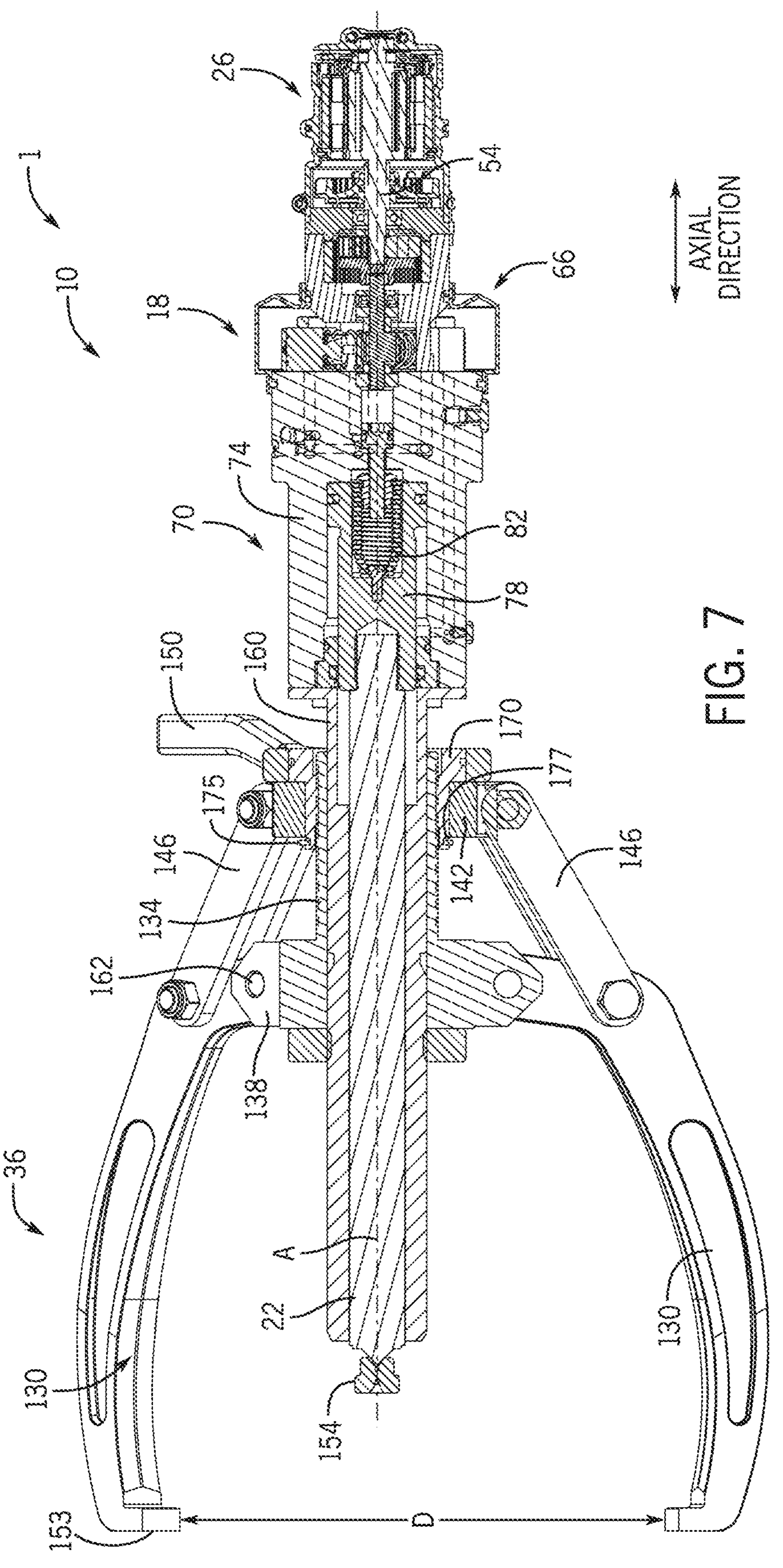
FIG. 7 is a cross-sectional view of the puller of FIG. 6.
Figure 9:
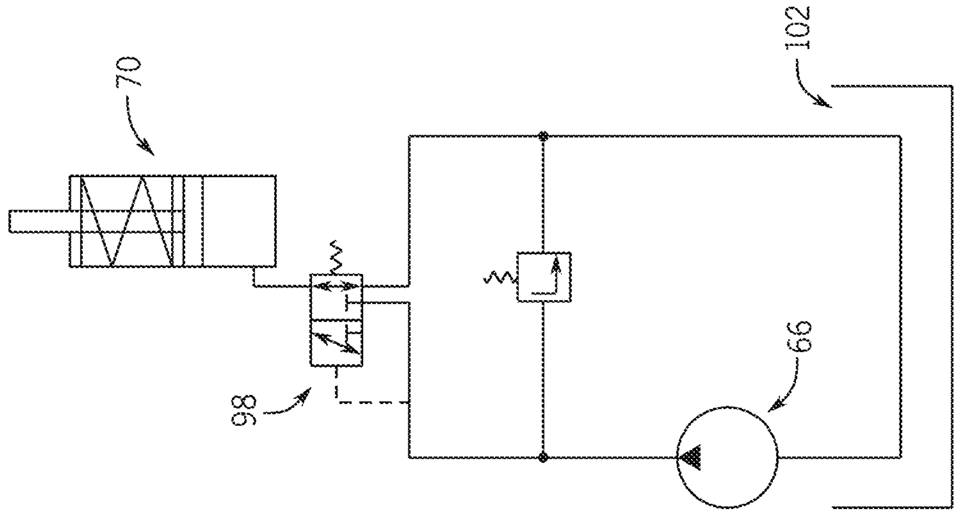
FIG. 9 is a hydraulic circuit diagram of the puller of FIG. 5.
Figure 8:
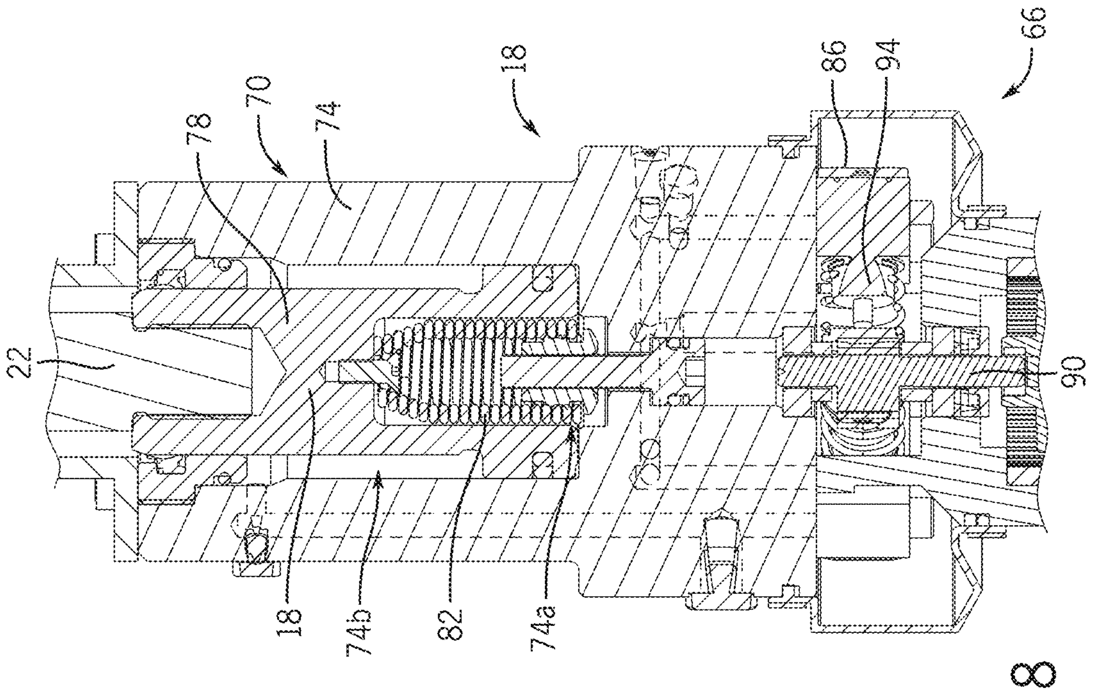
FIG. 8 is a cross-sectional view of an enlarged portion of the puller shown in FIG. 7.

With reference to FIGS. 7-9, additional details are now provided for the motor 26 and the drive mechanism 18 of the puller 10 from FIG. 4 (which as stated above, also generally relates to other examples of pullers 10 and hydraulic tools 1 disclosed herein). In the illustrated construction, the motor 26 is an electric motor having a motor shaft 54 coaxially extending along the axis A; however, in other constructions (not shown), a different type of motor may be provided. The drive mechanism 18 includes a pump 66 driven by the motor 26 and a piston and cylinder assembly 70. The illustrated drive mechanism 18 is a micro-hydraulic drive mechanism (e.g., with components having a nominal width up to about 3 mm, a flow rate of up to about 20 cubic inches/min, and a pressure output of up to about 700 bar). By way of example, the MPE line of pumps produced by Hawe (e.g., MPE 6, with a 6 mm piston) could be used as the pump 66.

The piston and cylinder assembly 70 includes a cylinder 74 and an extensible piston 78 disposed within the cylinder 74 and connected to the spindle 22. The piston 78 divides the cylinder 74 into chambers 74*a*, 74*b*. The pump 66 provides pressurized hydraulic fluid to the cylinder 74 (e.g., to the chamber 74*a*), causing the piston 78 to extend relative to the cylinder 74. Specifically, in the illustrated construction, the piston 78 (along with the spindle 22) is movable in an axial direction along the axis A from a retracted position to an extended position relative to the cylinder 74 as a result of pressurized fluid supplied by the pump 66 to the chamber 74*a*. In the illustrated example, the piston 78 is moveable along a piston axis and the spindle 22 is moveable along a spindle axis and is parallel to, or here substantially coaxial with, the piston axis (each being shown by as axis A). By way of example, the RAC106 model of piston cylinder assembly produced by Enerpac Tool Group could be used as the piston and cylinder assembly 70.

A biasing member (e.g., a spring 82) is operable to return the piston 78 and the spindle 22 to the retracted position. In other constructions (not shown), the piston and cylinder assembly 70 may include a double-acting assembly with hydraulic fluid causing retraction of the piston 78 and the spindle 22.

The illustrated pump 66 includes a pump block 86 supporting a rotating pump shaft 90, driven by the motor shaft 54. A number of reciprocating pump pistons 94 (e.g., three; two shown in FIG. 8), supported by the pump block 86, are spaced circumferentially about (e.g., about 120° apart) and driven by the pump shaft 90. A valve assembly 98 is operable to control the flow of hydraulic fluid from the pump 66 to the cylinder 74 to control extension of the piston 78. In the illustrated construction, a reservoir 102 (see FIG. 9), for containing hydraulic fluid, is provided by the cylinder chamber 74*b*. By way of example, Enerpac Tool Group produces a valve assembly (model DD7070900) that could be used as the valve assembly 98.

Returning to FIGS. 2-4, the battery pack interface 46 is adjacent to the end of the handle portion 50 and removably supports the battery pack 30. As illustrated, an interface 40 in which electrical connections between the battery pack 30 and the battery pack interface 46 are mated is oriented to receive the battery pack 30 along an insertion axis 106 oriented parallel to the axis A. Alternatively, the insertion axis 106 may be perpendicular or oblique to the axis A.

Figure 5:
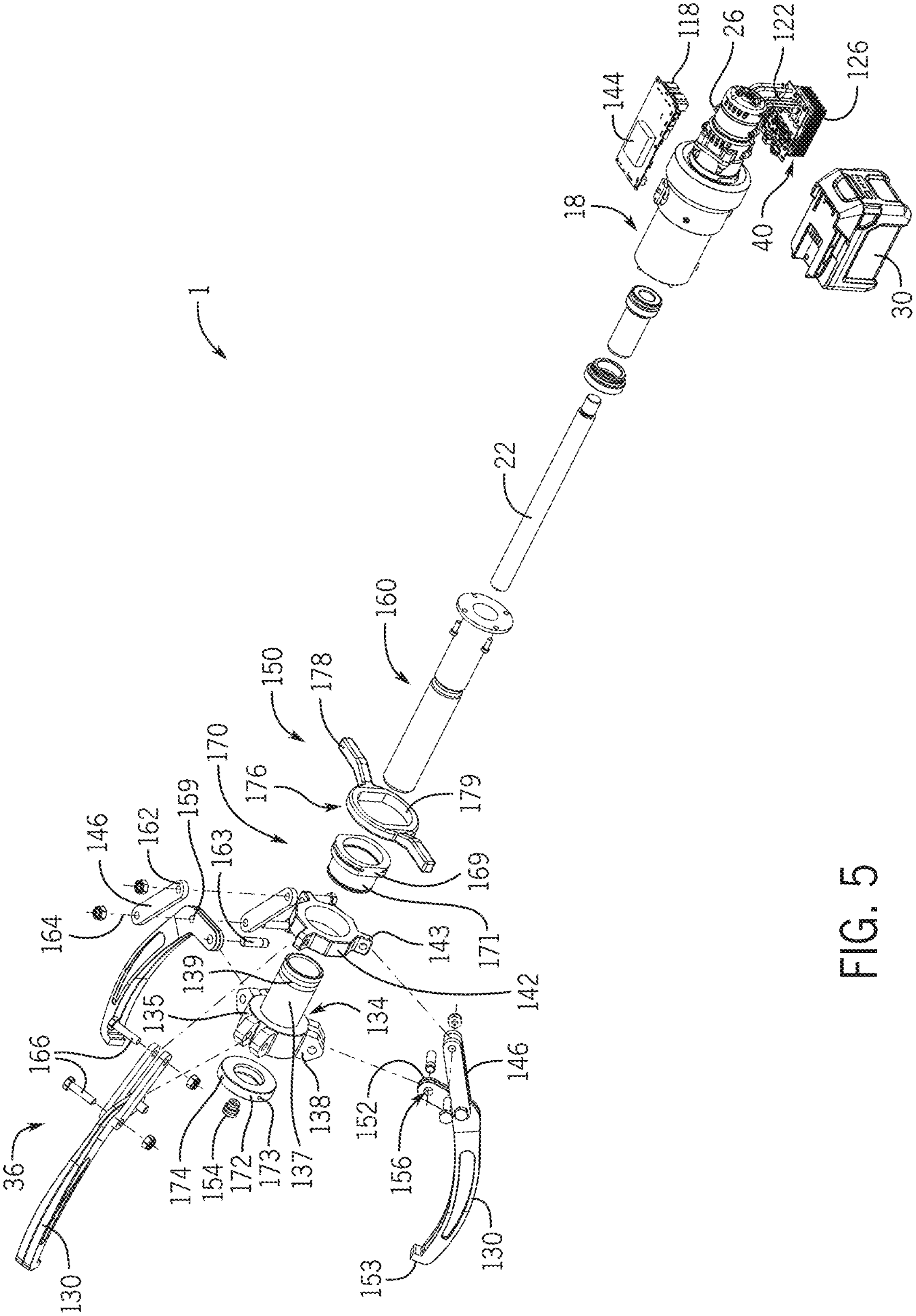
FIG. 5 is an exploded perspective view of a puller similar to that of FIG. 4 but shown having 3 jaw members and with a portion of the housing removed.

As mentioned above, the battery pack interface 46 supports the battery pack 30. In the illustrated embodiments, the battery pack 30 is a removable and rechargeable power tool battery pack and is operable to power electrical components of the puller 10, such as the motor 26 and control boards 118, 122 (FIG. 5, discussed further below). The battery pack 30 may be connectable and operable to power various different power tools (e.g., the nut splitter 210 of FIG. 1C or the cutter 410 of FIG. 1D, a hydraulic flange splitter, a driver, or other tools).

The illustrated battery pack 30 includes one or more battery cells arranged to provide a nominal voltage and capacity of the battery pack 30. For example, the battery pack 30 may be a 54-volt battery pack and may include fifteen (15) Lithium-ion (Li-ion) battery cells. In other constructions, the battery pack 30 may include fewer or more battery cells arranged to have a different nominal voltage or capacity. The battery cells may have a chemistry other than Li-ion such as, for example, Nickel Cadmium (NiCd), Nickel Metal-Hydride (NiMH), etc.

With reference to FIGS. 4 and 5, a controller 114, supported in the housing 14, is configured to control operation of the puller 10 and its components. The controller 114 includes an electronic processor (not shown) mounted on a printed circuit board (PCB) providing a main control board 118 for the puller 10. As illustrated, the main control board 118 is positioned in the motor housing portion 38. In other examples, the control board 118 may be positioned in other locations in the housing 14 based on factors such as weight, balance, ergonomics, fit, heat management, and/or the like.

A motor driver control board 122 is supported in the motor housing portion 38 and is in communication with the main control board 118. A heat sink 126 is supported on the motor control board 122. Heat from the heat sink 126 and the motor control board 122 is vented through the vents in the motor housing portion 38 and away from the handle portion 50 and the operator.

The controller 114 is electrically and/or communicatively connected to a variety of modules or components of the puller 10. The controller 114 includes a plurality of electrical and electronic components on the control board(s) 118 and/or 122 that provide power, operational control, and protection to the components and modules within the controller 114 and/or the puller 10. For example, the controller 114 includes, among other things, the electronic processor (a programmable electronic microprocessor, microcontroller, or similar device), a memory (not shown), and an input/output (I/O) interface. The electronic processor is communicatively coupled to the memory and the I/O interface.

The controller 114 may be implemented in several independent controllers each configured to perform specific functions or sub-functions. Additionally, the controller 114 may contain sub-modules that include additional electronic processors, memory, or application specific integrated circuits (ASICs) for handling communication functions, processing of signals, and application of the methods listed below. In other embodiments, the controller 114 includes additional, fewer, or different components.

The memory is, for example, a non-transitory, machine-readable memory. The memory includes, for example, one or more non-transitory machine-readable media, a program storage area, and a data storage area. The program storage area and the data storage area can include combinations of different types of memory, such as read-only memory (ROM) and random access memory (RAM). In some embodiments, data is stored in a non-volatile random-access memory (NVRAM) of the memory. Various non-transitory computer readable media, for example, magnetic, optical, physical, or electronic memory may be used.

In the illustrated embodiment, the memory includes an input controller engine (not shown; for example, software or a set of computer-readable instructions that determines functions to be executed in response to inputs) and torque multiplier functions (for example, software or a set of computer-readable instructions that provide functionality to the puller 10).

The electronic processor is communicatively coupled to the memory and executes software instructions that are stored in the memory, or stored in another non-transitory computer readable medium such as another memory or a disc. The software may include one or more applications, program data, filters, rules, one or more program modules, and other executable instructions. In some embodiments, the memory stores predetermined functions that are executed to provide torque multiplier functionality within the program storage area.

The I/O interface is communicatively coupled to components external to the controller 114 and coordinates the communication of information between the electronic processor and other components of the puller 10. In illustrated examples, information received from an input component, an external device, etc. is provided to the electronic processor to assist in determining functions to be executed and outputs to be provided. The determined functionality is executed with the electronic processor with the software located the memory.

The puller 10 may include one or more sensors (not shown) operable to sense a characteristic of the puller 10. For example, the sensors may include a motor sensor, a movement sensor, a temperature sensor, etc. The controller 114 is connected to and communicates with (e.g., receives measurement signals from) the sensor(s).

The puller 10 may include an operator interface (not shown) positioned on the housing 14 or on a remote control device (not shown) and operable to communicate information and instructions to/from the operator. The operator interface may include an input device (e.g., one or more buttons, keys, a touch screen, etc.) and an output device (e.g., a display) configured to display conditions or data associated with the puller 10.

The jaw assemblies 36 of FIGS. 2-3, 4, 5, and others may be similar to the mechanical pullers sold by Enerpac Tool Group Corp. such as, for example, the 18-ton, 3-jaw mechanical lock-grip puller, Model No. LGM318. The puller 10 of FIGS. 2-3 and 5 have three jaw members 130. Other examples of pullers 10 may be a jaw assembly 36 with a different number of jaw members 130 (e.g., FIG. 4 shows two jaw members similar to the Enerpac Model No. LGM211, 11-ton, 2-jaw mechanical lock-grip puller) and/or a different pulling capacity. Information on the Enerpac mechanical pullers is hereby incorporated by reference. Components of the jaw assembly 36, including the jaw members 130, may be formed of a relatively lighter weight material, for example, aluminum, to reduce the weight of the puller 10 while still being able to withstand the required pulling forces.

Figure 6:
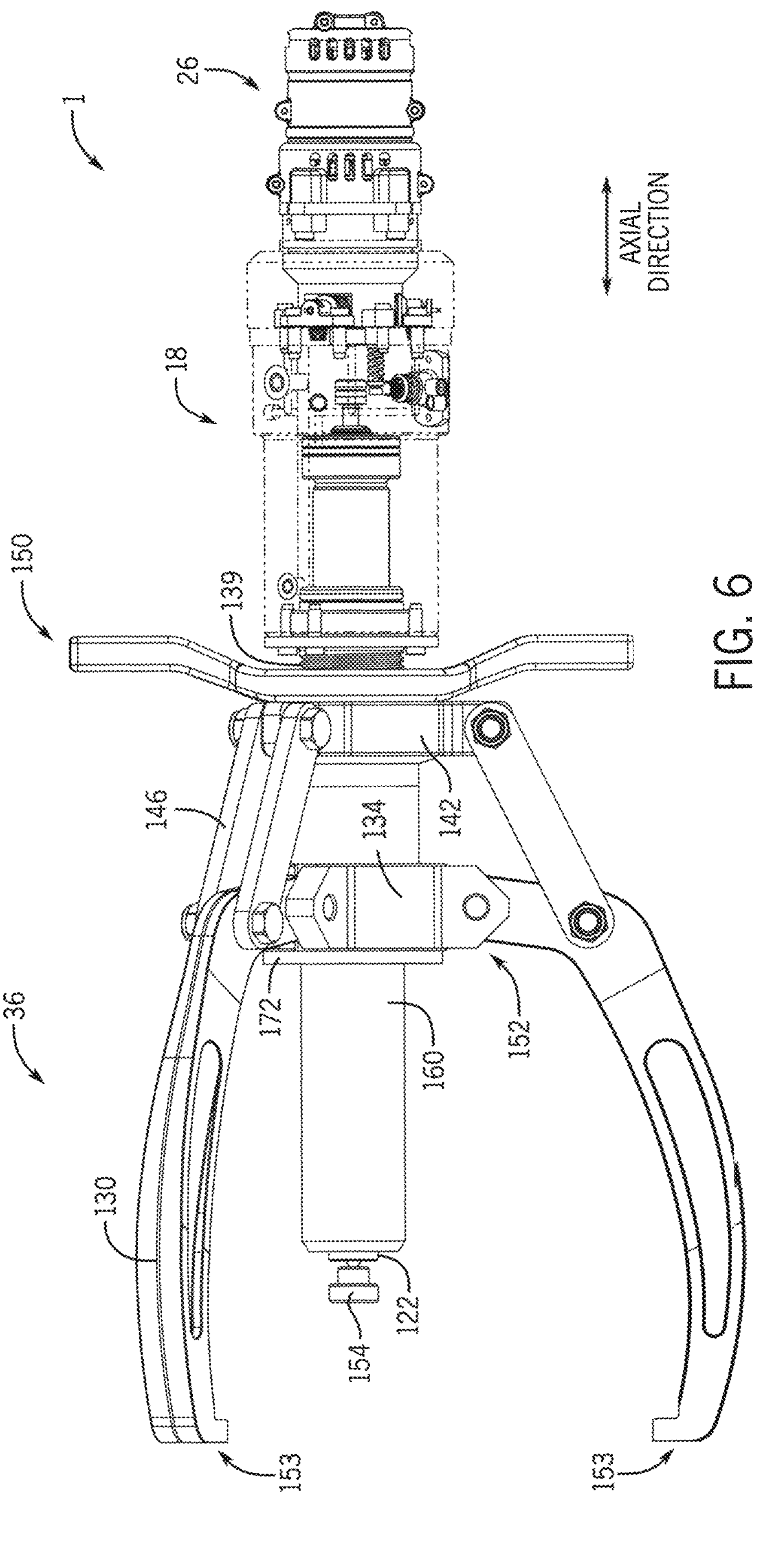
FIG. 6 is a partial side view of the puller from FIG. 5, illustrated with the housing and the battery pack removed.

FIGS. 5-7 show additional detail for a jaw assembly 36 similar to that of FIG. 4, but having three jaw members 130. Each of the jaw members 130 extends between a first end 152 and a second end 153, here being curved in an arc or approximately C-shaped configuration. An opening 156 is provided substantially near the first end 152, as well as an opening 159 provided closer to the first end 152 than to the second end 153. The first end 152 is supported by the housing 14, as discussed further below, and the second end 153 is configured to engage the workpiece. A distance D spans between the second ends 153 of two jaw members 130 at any given point in time, which may be adjustable as discussed below.

A hollow member 160 is supported by the housing 14 (FIG. 4), in the illustrated example being coupled to the cylinder 70 supported therein. A first collar 134 is supported on the outer surface of the hollow member 160, here being permitted to slide in the axial direction thereon and also being permitted to rotate about the hollow member 160. The first collar 134 has a flange portion 135 and an elongated cylindrical portion 137. The flange portion 135 has a larger outer diameter than the elongated cylindrical portion 137, which each have the same inner diameter that generally corresponds to the outer diameter of the hollow member 160. Bracket members 138 are fixed to (e.g., formed with) the first collar 134, here being tabs that extend radially outwardly from the flange portion 135. The bracket members 138 are configured for pivotably supporting the jaw members 130. In particular, fasteners 163 (e.g., pins, bolts and nuts) pivotally couple the first ends 152 of the jaw members 130 to the bracket members 138.

A stop ring 172 is also supported on the outer surface of the hollow member. The stop ring 172 has an inner diameter that generally corresponds to the hollow member 160 and is fixable to the hollow member 160 via set screws 173 that extend through threaded openings 174 in the stop ring 172 to engage with the hollow member 160. The stop ring 172 therefore prevents the first collar from 134 from moving farther from the housing 14 in the axial direction, whereby the axial position of the stop ring 172 is adjustable via the set screws 173. The present disclosure contemplates other mechanisms for preventing axial movement of the first collar 134, such as welding or adhering the stop ring 172 the hollow member 160, threaded engagement between the first collar 134 and the stop ring 172, or other techniques known in the art.

With continued reference to FIGS. 5-7, a second collar 170 is supported on the outer surface of the first collar 134, and specifically on the cylindrical portion 137 of the first collar 134, here being permitted to slide in the axial direction thereon. The second collar 170 has a flange portion 169 and an elongated cylindrical portion 171. The flange portion 169 has a larger outer diameter than the elongated cylindrical portion 171, which each have the same inner diameter that generally corresponds to the outer diameter of the cylindrical portion 137 of the first collar 134. The flange portion 169 of the present example is not entirely circular, but has a feature such as a notch or a flat portion along the outer surface thereof. The inner surface of the second collar 170 is threaded, which corresponds to threads 139 along the outer surface of the cylindrical portion 137 of the first collar 134. In this manner, rotating the second collar 170 relative to the first collar 134, by virtue of the threaded engagement therebetween, changes an axial distance between the second collar 170 and the first collar 134, as discussed further below. The second collar 170 may therefore also be referred to as a nut.

A handle 150 has a generally circular center portion 176 and two grip portions 178 extending radially away therefrom. An interior shape 179 of the center portion 176 corresponds to the exterior shape of the flange portion 169 of the second collar 170. The handle 150 is positionable over the flange portion 169 of the second collar 170 such that the handle 150 and the second collar 170 are aligned in the axial direction, and also coaxially aligned in the radial direction. When positioned in this manner, rotation of the handle 150 causes rotation of the second collar 170, which as stated above is threadingly engaged with the threads 139 of the cylindrical portion 137 of the first collar 134. The present disclosure also contemplates configurations in which the handle 150 and the second collar 170 are integrally formed or coupled together. Likewise, the present disclosure contemplates configurations in which the handle 150 is not only configured for rotating the second collar 170, but may also be held by the operator to support the weight of the hydraulic tool 1.

A third collar 142 is supported on the outer surface of the cylindrical portion 171 of the second collar 170, which is permitted to rotate thereon and also permitted to slide in the axial direction thereon. The flange portion 169 of the second collar 170, which has a greater outer diameter than the cylindrical portion 171, thereby prevents the third collar 142 from moving in the axial direction past the flange portion 169. On the other side of the third collar 142, a c-clip 175

(see FIG. 7) is retained within a channel 177 in the outer surface of the cylindrical portion 171 of the second collar 170. The c-clip 175 therefore prevents the third collar 142 from moving in the axial direction away from the flange portion 169. In this manner, rotating the handle 150 rotates the second collar 170, which may rotate within the third collar 142 (i.e., rotating the handle 150 does not necessarily rotate the third collar 142).

Bracket members 143 extend radially outwardly from the second collar 142 in a similar manner to the bracket members 138 of the first collar 134. Links or linkages 146 couple the jaw members 130 to the second collar 142. In particular, each linkage 146 extends between a first end 162 and a second end 164 with openings at each. Fasteners 166 (e.g., pins, bolts with cotter pins, or bolts and nuts, as shown) pivotally couple the first ends 162 of the jaw members 130 to the second collar 142 via the bracket members 143 thereof. Likewise, fasteners 166 pivotally couple the second ends 164 of the linkages 146 to the openings 159 in the jaw members 130 that are not at either the first ends 162 or the second ends 264 thereof, but closer to the first ends 162.

It should be recognized that based on the structures described above, moving the third collar 142 relative to the first collar 134 (and thus, relative to the hollow member 160), causes the jaw members 130 to pivot about the first ends 162 thereof by virtue of the linkages 146. Consequently, this changes the distance D between the second ends 164 of two jaw members 130 (see FIG. 7). This allows the operator to move the jaw members 130 into and out of engagement with the shaft-mounted part (e.g., the bearing B). The present inventors have designed the illustrated puller 10 in this manner so that the jaw members 130 can be adjusted to accommodate different sizes and configurations of workpieces. It is further advantageous that no tools are required for this adjustment, which is also adjustable independently from operation of the hydraulic tool 1.

It should be recognized that other configurations are contemplated by the present disclosure for which the first collar 134, the second collar 170, and the third collar 142 are slidable in the axial direction relative to the cylinder 70 and housing of the hydraulic tool 1. In some examples, the third collar 142 is supported on the outer surface of the hollow member 160. In other examples, the third collar 142 is supported on the outer surface of the hollow member 160 and the first collar 134 is supported on the outer surface of the third collar 142. The second collar 170 and the third collar 142 may also be formed or coupled together (as well as the handle 150 therewith).

With continued reference to FIGS. 5-7, the spindle 22 extends from a first end 180 to a second end 182. The spindle 22 extends through the hollow member 160 such that the first end 180 is operatively coupled to the drive mechanism 18, such as to be pushed by the piston 78. The second end 182 extends out of the hollow member 160 for contacting a portion of the workpiece. In general, the drive mechanism 18 causes the piston 78 to push the spindle 22 in the axial direction while the jaw members 130 remain stationary. A point protector 154 may be provided and supported on the end of the spindle 22 (e.g., at the second end 180 thereof), for example if the shaft S of the workpiece does not have a drilled center hole.

To use the puller 10, a battery pack 30 with sufficient capacity and voltage is connected to the battery interface 46. The adjustment handle 150 is operated (e.g., threaded along the first collar 134) to position (i.e., open) the jaw members 130 to receive the shaft-mounted part. Once the jaw members 130 are positioned, the adjustment handle 150 is operated to cause (i.e., to close) the jaw members 130 to engage the shaft-mounted part. The spindle 22 is extended to engage the shaft S.

With the puller 10 in position and engaged with the workpiece W (the bearing B and the shaft S, see FIG. 4), the operator engages the handle portion 50 and, if provided, the auxiliary handle 158 to support and control the puller 10 in a stable, comfortable and/or convenient manner during the pulling operation. The operator engages the trigger 110 to operate the motor 26 and the hydraulic drive mechanism 18. With the jaw assembly 36 holding the part in position, the piston 78 and the spindle 22 extend (e.g., up to about 50 millimeters or more) to "pull" the part off the shaft S. The puller 10 is operated until the shaft mounted part (e.g., the bearing B) is removed from the shaft S. In certain examples, the cycle time for the pulling operation is about 5 to 10 seconds (e.g., about 6.6 seconds).

When the pulling operation is completed, the part is retained by the jaw assembly 36 after removal from the shaft S. The operator releases to trigger 110 to stop operation of the motor 26 and the pump 66. With hydraulic pressure reduced, the valve assembly 98 connects the chamber **74*a* to the reservoir (e.g., to the chamber 74*b*) to reduce the pressure acting on the piston 78. In the illustrated construction, the spring 82 applies a force to return the piston 78 and the spindle 22 to the retracted position. The part is then removed from the jaw assembly 36 by operating the adjustment handle 150 to open the jaw members 130. The puller 10 may then be positioned for another pulling operation. As the puller 10 is repositioned on workpieces, the operator grasps the handle portion 50 and, if provided, the auxiliary handle 158**.

Figure 10:
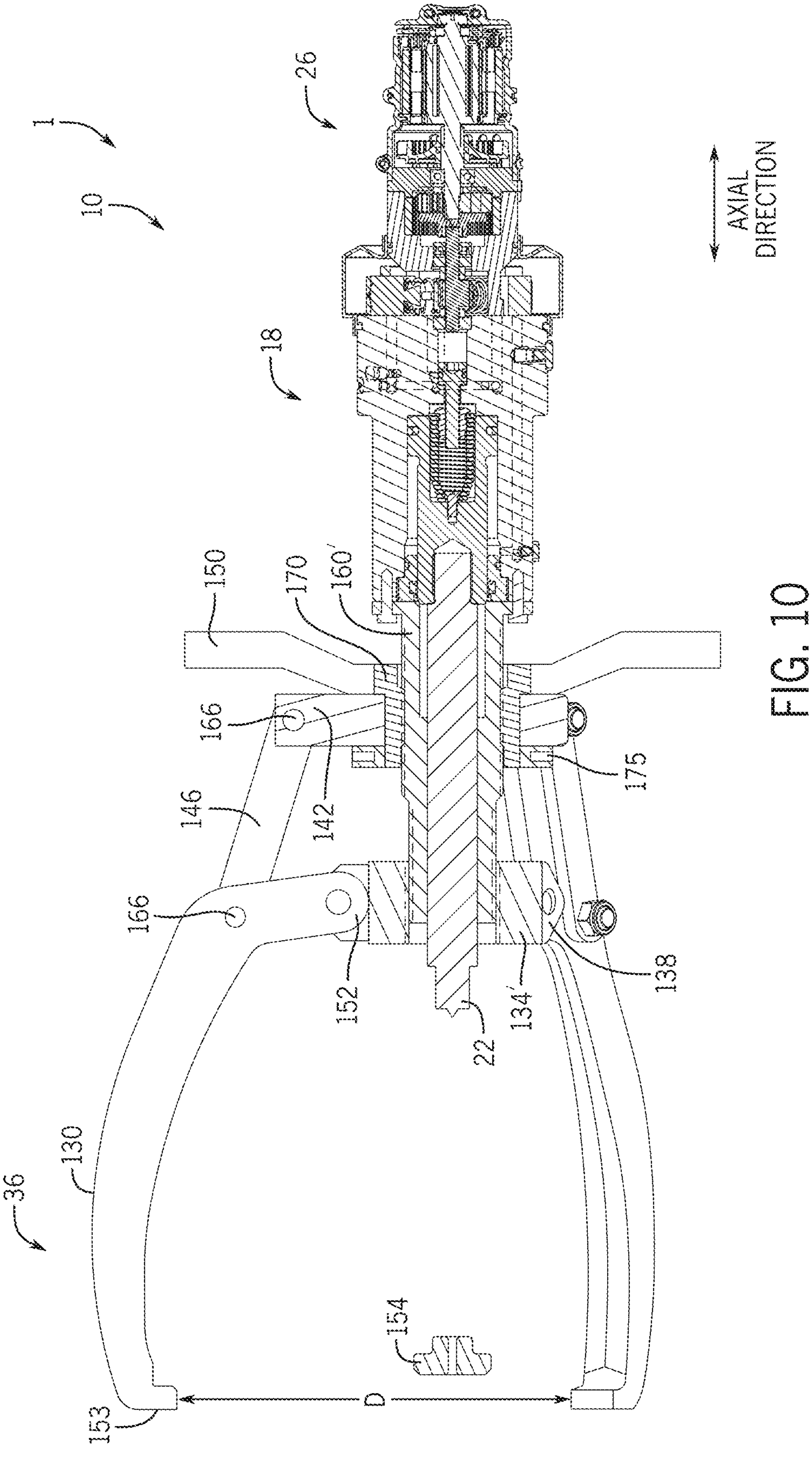
FIG. 10 is a cross-sectional view similar to that of FIG. 7 but for the puller of FIG. 2.
Figure 11:
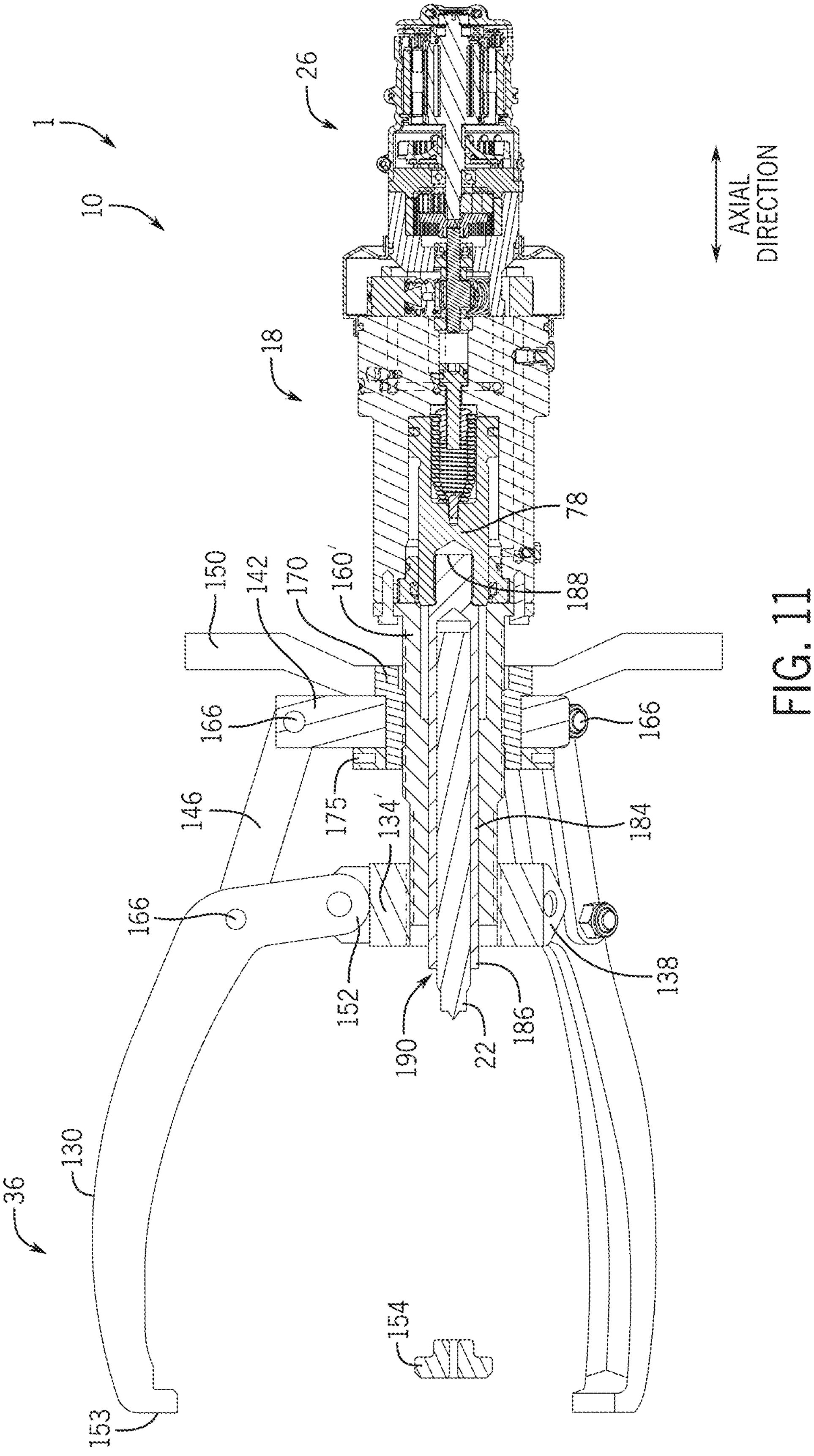
FIG. 11 is a cross-sectional view similar to that of FIG. 7 but for another puller.
Figure 12:
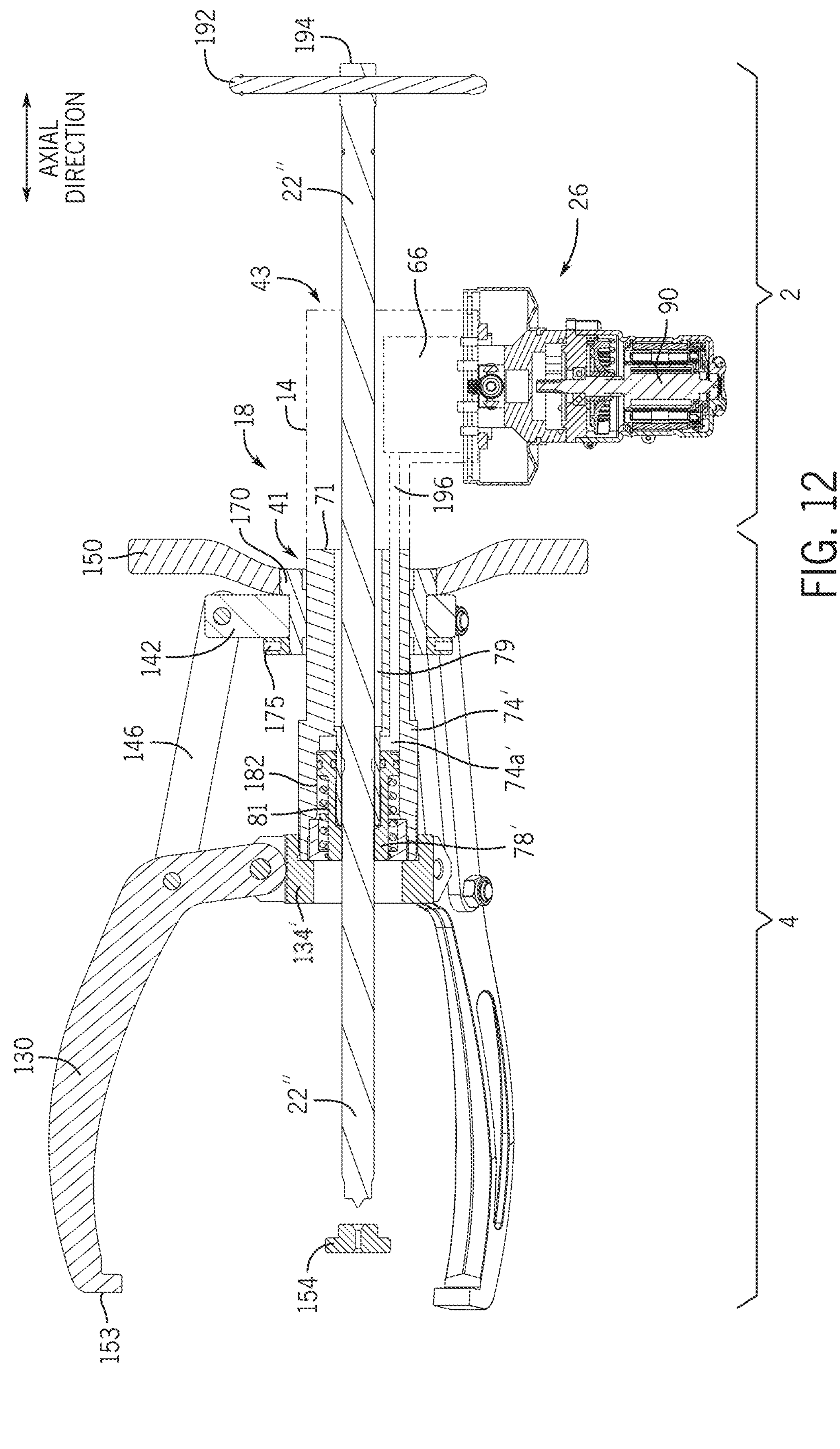
FIG. 12 is a cross-sectional view similar to that of FIG. 7 but for another puller.

FIGS. 10-12 show additional examples of pullers 10 according to the present disclosure. Since many of the components may be the same or similar to those discussed above, the same reference numbers are provided where possible for brevity. By way of example, the jaw assembly 36, motor 26, drive mechanism 18, and other aspects of the pullers 10 of FIGS. 10-12 may be the same or similar to those described above.

With reference to the puller 10 of FIG. 10, the second collar 170 may again threadingly engage with the outer surface of the hollow member 160. Therefore, rotation of the handle 150 once again moves the second collar 170 in the axial direction, also moving the third collar 142 therewith as described above. In contrast to the puller of FIG. 7, the puller 10 advantageously has a shorter length along the axial direction by rigidly the first collar 134' to the hollow member 160' without the use of a stop ring 172. Rather, the first collar 134' may be fixed to the outer diameter of the hollow member 160' via a mechanical stop, threaded engagement therebetween, and/or welding, adhesives, set screws, or other mechanisms and techniques known in the art.

In the illustrated puller 10 of FIG. 10, it can be seen that the first collar 134 extends farther than the hollow member 160' from the drive mechanism 18. This allows the spindle 22 to be close to the drive housing 18 in its most retracted position, thereby advantageously allowing the puller 10 to be used for deeper workpieces. It should be recognized that the movement of the spindle 22 may otherwise be effectuated in the same manner described above. Likewise, the distance D between the second ends 153 of the jaw members 130 may still be adjusted by rotation of the handle 150 in substantially the same manner described above.

FIG. 11 shows another example of a puller 10 that is similar to the example of FIG. 10, but now advantageously provides for a telescoping spindle 22' for further adjustability and to accommodate more types of workpieces. In particular, whereas the spindle 22 was supported by the inner surface of the hollow member 160' in FIG. 10, a separate sleeve 184 is now positioned radially between the hollow member 160' and the spindle 22'. The sleeve 184 has a substantially cylindrical shape that extends between a first end 186 and a second end 188. The outer surface of the sleeve 184 is smooth such that the sleeve 184 is moveable by the drive mechanism 18 within the hollow member 160 in the same or substantially similar manner as the spindle 22 of FIG. 10.

A threaded opening 190 extends from the first end 186 towards the second end 188 of the sleeve 184. Unlike the spindle 22 of FIG. 10, the spindle 22' of FIG. 11 has a threaded outer surface, which is particularly configured to engage with the threaded opening 190 of the sleeve 184. Rotating the spindle 22' relative to the sleeve 184 changes how far the spindle 22' extends from the first end 186 of the sleeve 184 (i.e., telescopes the spindle 22' relative to the sleeve 184 and thus relative to the piston 78). In this manner, an operator may choose the starting position of the spindle 22' in the axial direction before operating the drive mechanism 18, whereby operating the drive mechanism 18 further moves the spindle 22' (via engagement with the sleeve 184) in the manner described above.

The present inventors have recognized that this configuration advantageously offers the reduced size of the puller 10 as shown in FIG. 10, which also permitting the spindle 22' to be adjustable via the telescoping design. This functionality again increases the variety of workpieces that may be worked with the puller 10, as well as allowing the same tool to be used for particularly deep or long workpieces by adjusting the telescoped position of the spindle 22' during the process.

The present inventors have further recognized that the telescoping design of the spindle 22' allows different spindles to be used with the same tool, including different lengths, different materials, for replacement of worn parts, or spindles having different types of point protectors 154 (including having the point protectors being integrally formed or coupled to the end of the spindle).

FIG. 12 shows another example of a puller 10 in which the position of the spindle in the axial direction is adjustable, moving other than by operation of the drive assembly 18. As stated above, many of the components may be the same or similar to those described above. Among the distinctions for the puller 10 of FIG. 12 is that the back end 2 of the hydraulic tool 1 is oriented primarily vertically, or at an approximately 90 degree angle relative to the puller of FIG. 11. For example, the shaft 90 of the motor 26 is now arranged to extend substantially vertically, and here approximately perpendicularly to the piston axis and spindle axis that the piston and the spindle each move during operation. The drive mechanism 18 may a pump 66 that is driven by the motor 26 to function in a substantially similar manner to that described above or as otherwise known in the art (see e.g., FIGS. 8 and 9). In this manner, the pump 66 provides pressurized hydraulic fluid (e.g., via the conduit 196) to the cylinder 74' (e.g., to the chamber **74*a*'), causing the piston 78' to extend relative to the cylinder 74' as discussed above. Specifically, in the illustrated construction, the piston 78' (along with the spindle 22") is movable in the axial direction from a retracted position to an extended position relative to the cylinder 74' as a result of pressurized fluid supplied by the pump 66 to the chamber 74*a*'. In the illustrated example, the piston 78' is moveable along a piston axis and the spindle 22** is moveable along a spindle axis and is parallel to, or here substantially coaxial with, the piston axis.

In further contrast to earlier examples of pullers 10, the piston 78' has a threaded opening 81 that extends entirely therethrough in the axial direction. The threaded opening 81 is configured to mesh with threads on the outer surface of the spindle 22" such that an axial position of the spindle 22" relative to the piston 78' is adjustable via rotation of the spindle 22".

Additionally, the cylinder 74 has an opening 79 that is not only open at the front end through which the spindle 22" extends, but also at an opposite back end 71. This allows the spindle 22" to extend out the back 43" of the housing 14 so as to be accessible by the operator. A handle 192 is provided at the end 194 of the spindle 22" that extends out the back 43' of the housing 14 that is opposite the end of the spindle 22" configured to work on the workpiece or contact the point protector 154. In this manner, the operator may use the handle 192 to rotate the spindle 22" within the piston 78', thereby adjusting the axial position of the spindle 22" to accommodate for different workpieces and the like.

Figure 13:
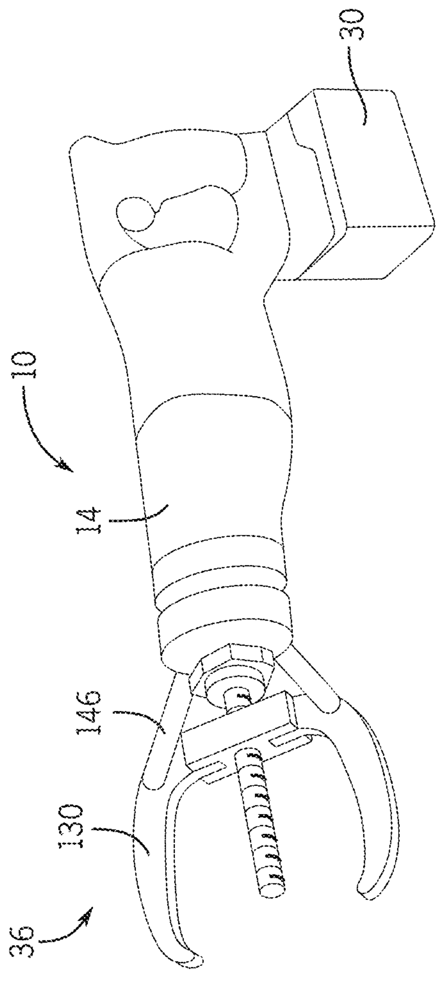
FIG. 13 is a perspective view of another example of a puller.
Figure 14:
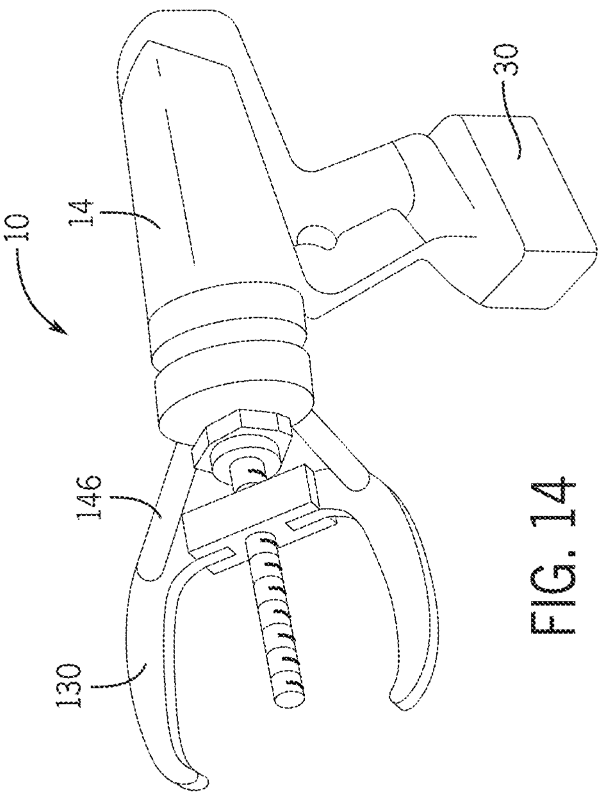
FIG. 14 is a perspective view of another example of a puller.

FIGS. 13 and 14 illustrate other examples for configurations of pullers 10. These may vary in the number of jaw members 130 within the jaw assembly 36, the configuration of the housings 14 (e.g., a reciprocating saw type configuration in FIG. 13, a power drill type configuration in FIG. 14), and other variations depending on the intended use of the tool.

Figure 15:
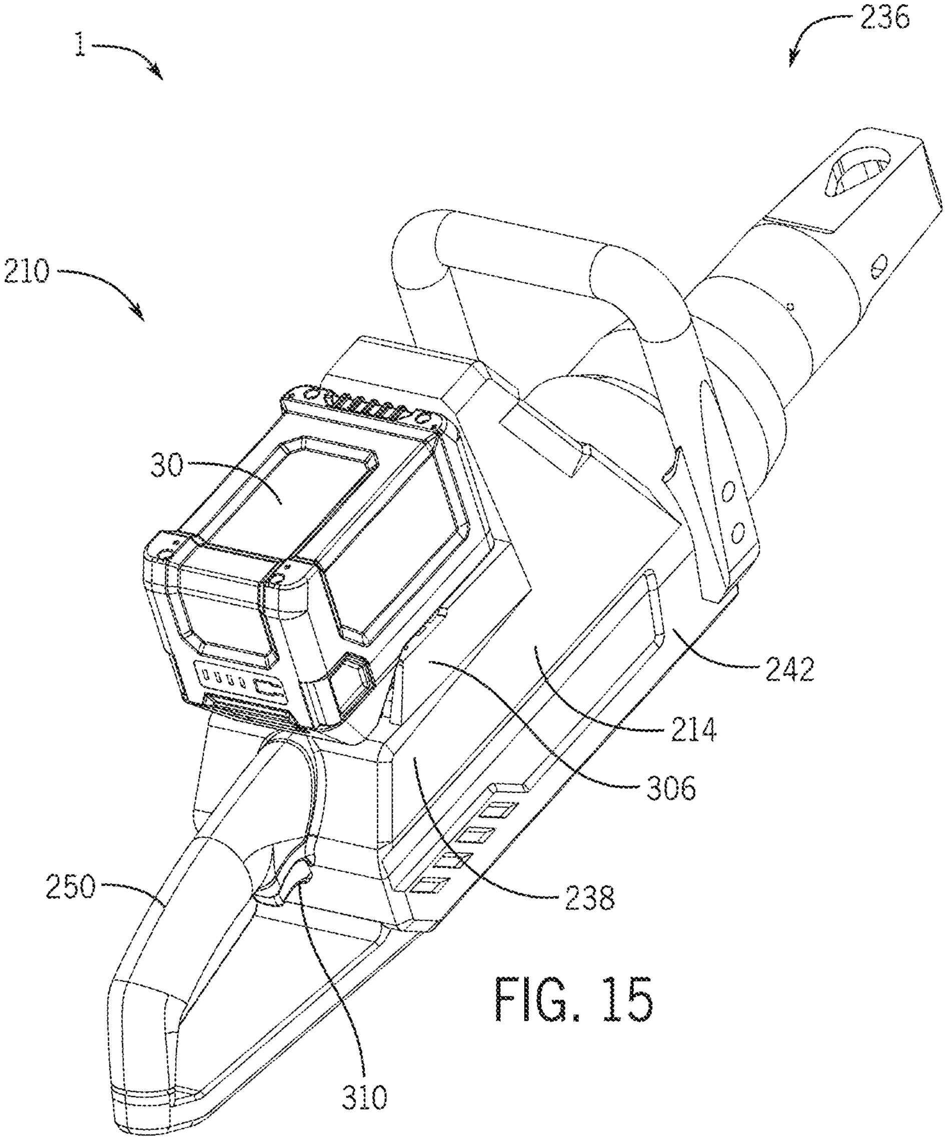
FIG. 15 is a rear perspective view of the splitter shown in FIGS. 1A and 1C.
Figure 16:
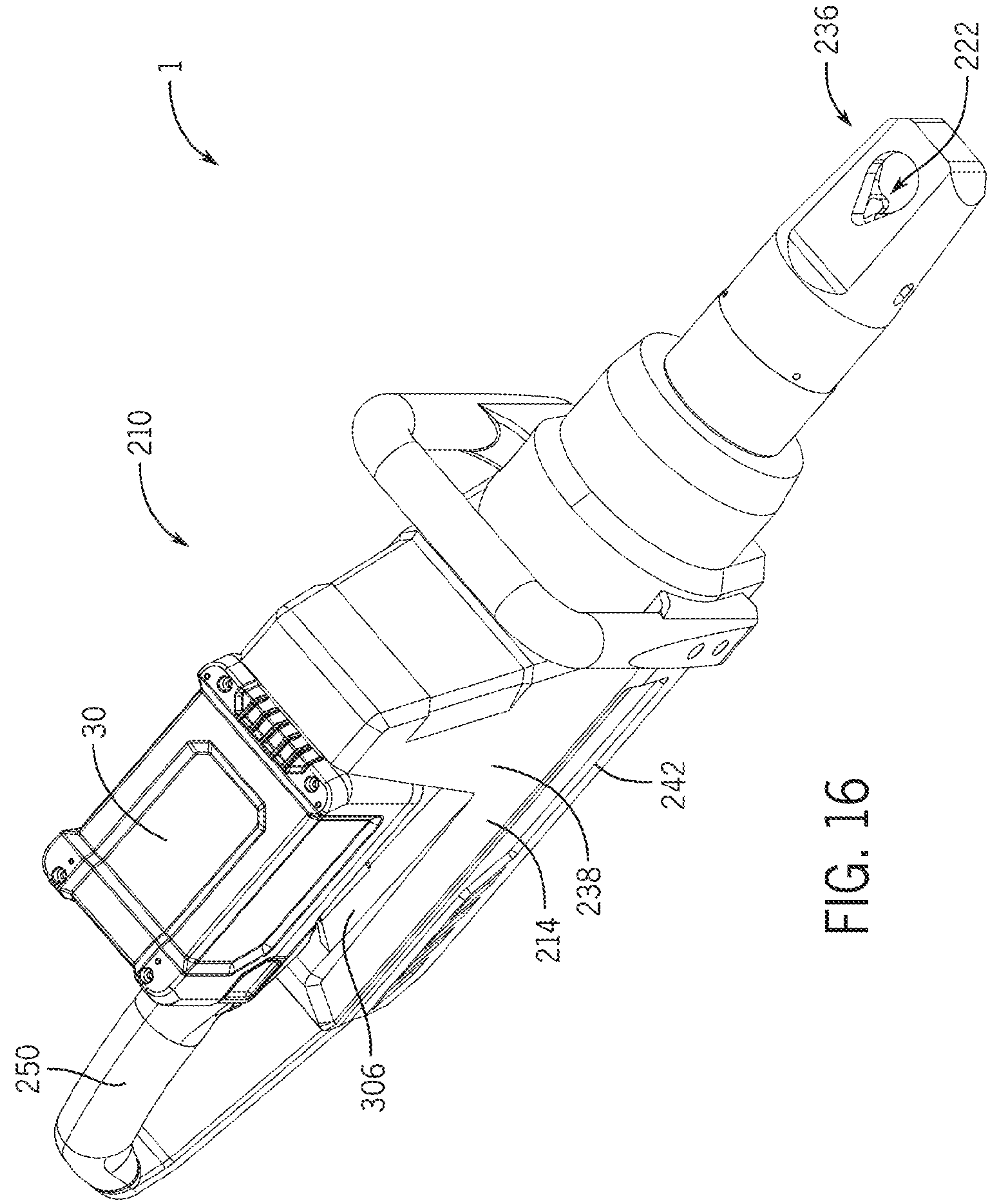
FIG. 16 is a front perspective view of the splitter of FIG. 15.
Figure 19:
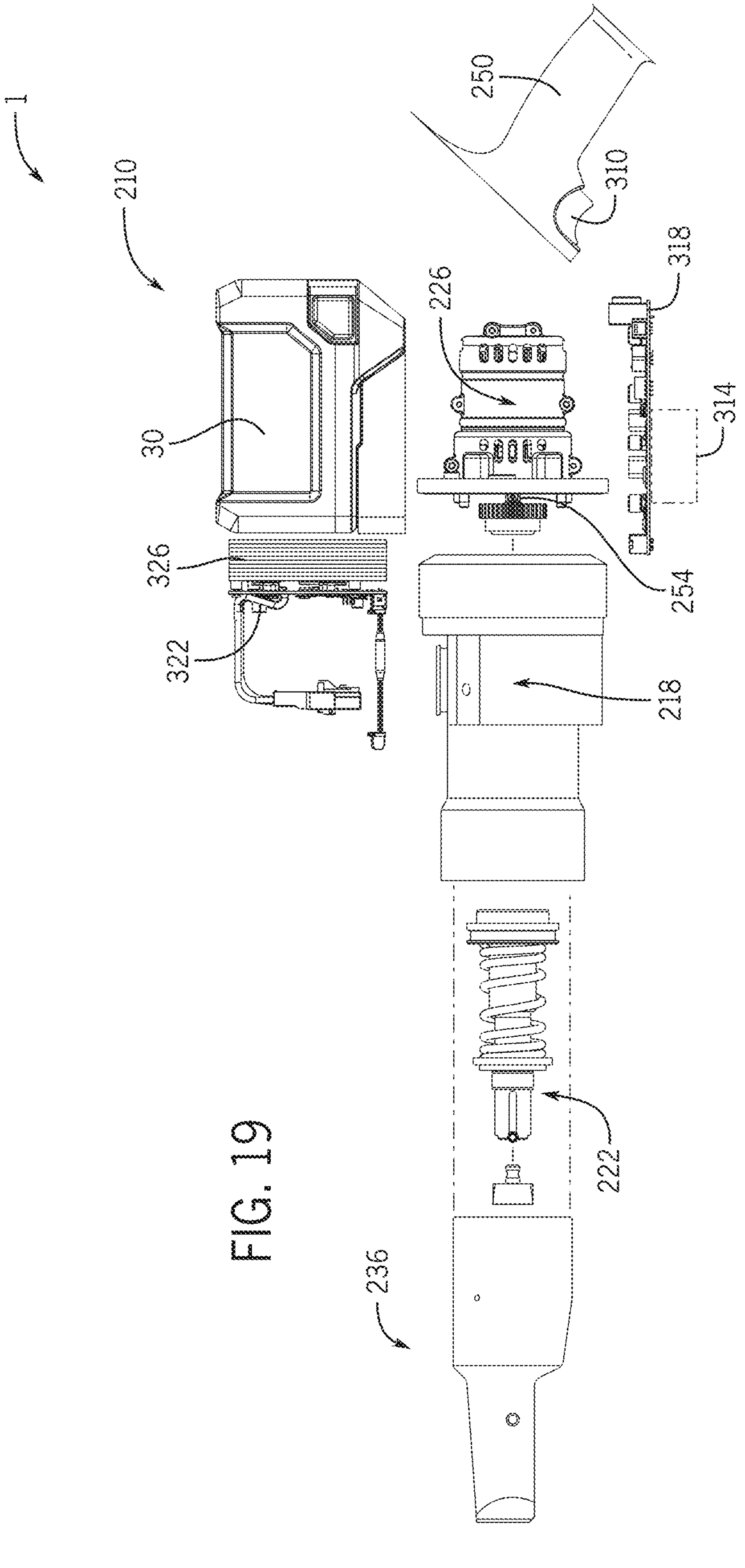
FIG. 19 is a side view of the splitter of FIG. 15, illustrated with a portion of the housing removed.
Figure 20:
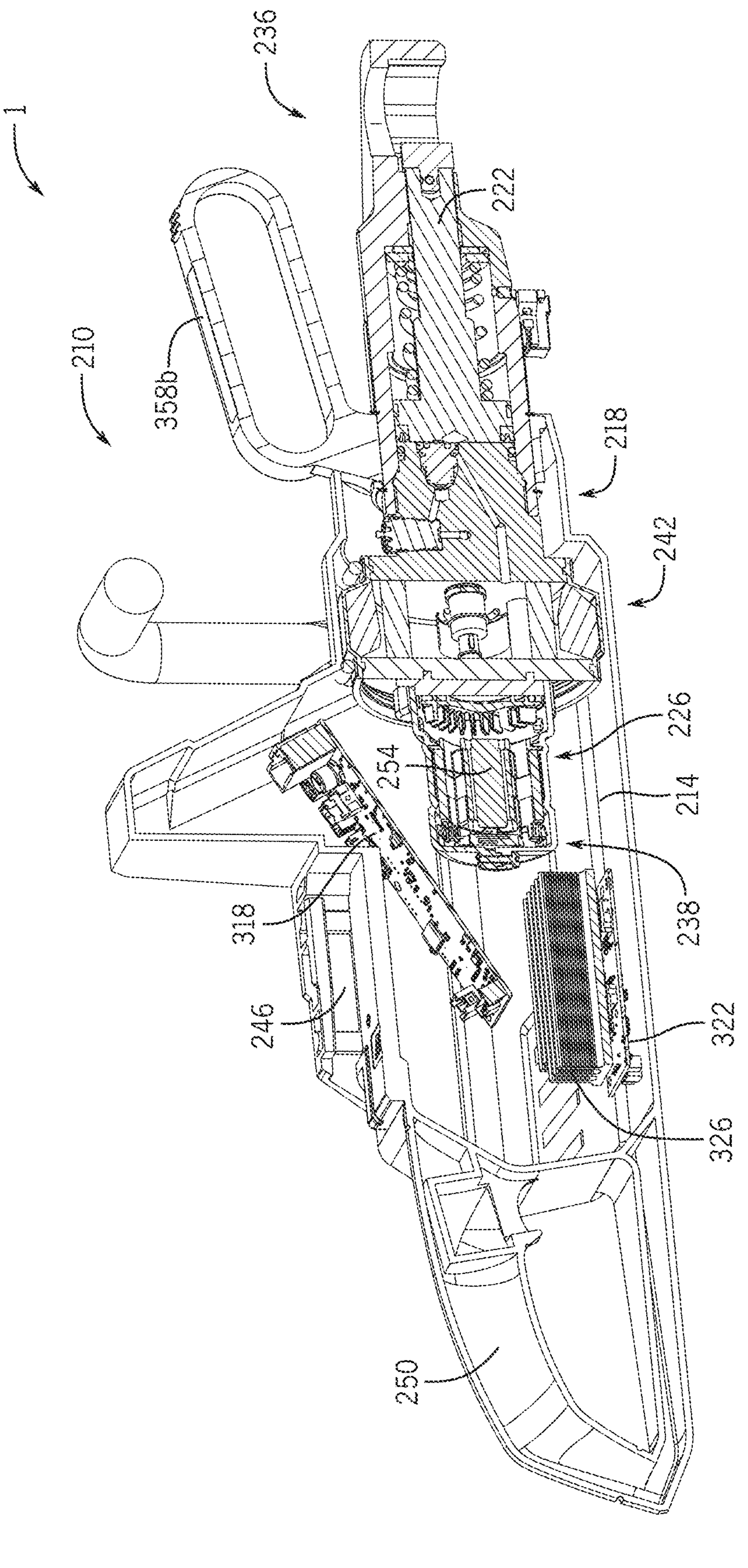
FIG. 20 is a cross-sectional view of the splitter of FIG. 15, illustrated with the battery pack removed.

FIGS. 15 and 16 illustrate constructions of another type of hydraulic tool 1, specifically the hydraulic nut splitters 210. Components of the nut splitter 210 are similar to components of the puller 10 described above. Similar features have the same reference number plus "200". The illustrated splitters 210 of FIGS. 19-21 generally include a housing 214, and, supported by the housing 214, a hydraulic drive mechanism 218 for driving a splitter spindle 222 along an axis A, a motor 226 for powering the drive mechanism 218, a power source (e.g., a battery pack 30) to power the motor 226, and a splitter head assembly 236. The housing 214 generally includes a motor housing portion 238, a drive mechanism portion 242, a battery pack interface 246, and a handle portion 250 configured to be gripped by an operator to control operation of the splitter 210. The illustrated motor housing portion 238 supports the motor 226. In the illustrated construction, the motor 226 is an electric motor having a motor shaft 254 extending along the axis A; however, in other constructions (not shown), a different type of motor may be provided.

The drive mechanism portion 242 supports the drive mechanism 218. The illustrated drive mechanism portion 242 is between the motor housing portion 238 and the splitter head assembly 236. The handle portion 250 extends from an end of the motor housing portion 38 opposite the splitter head assembly 236 and defines a grip portion roughly parallel to the axis A.

Figure 21:
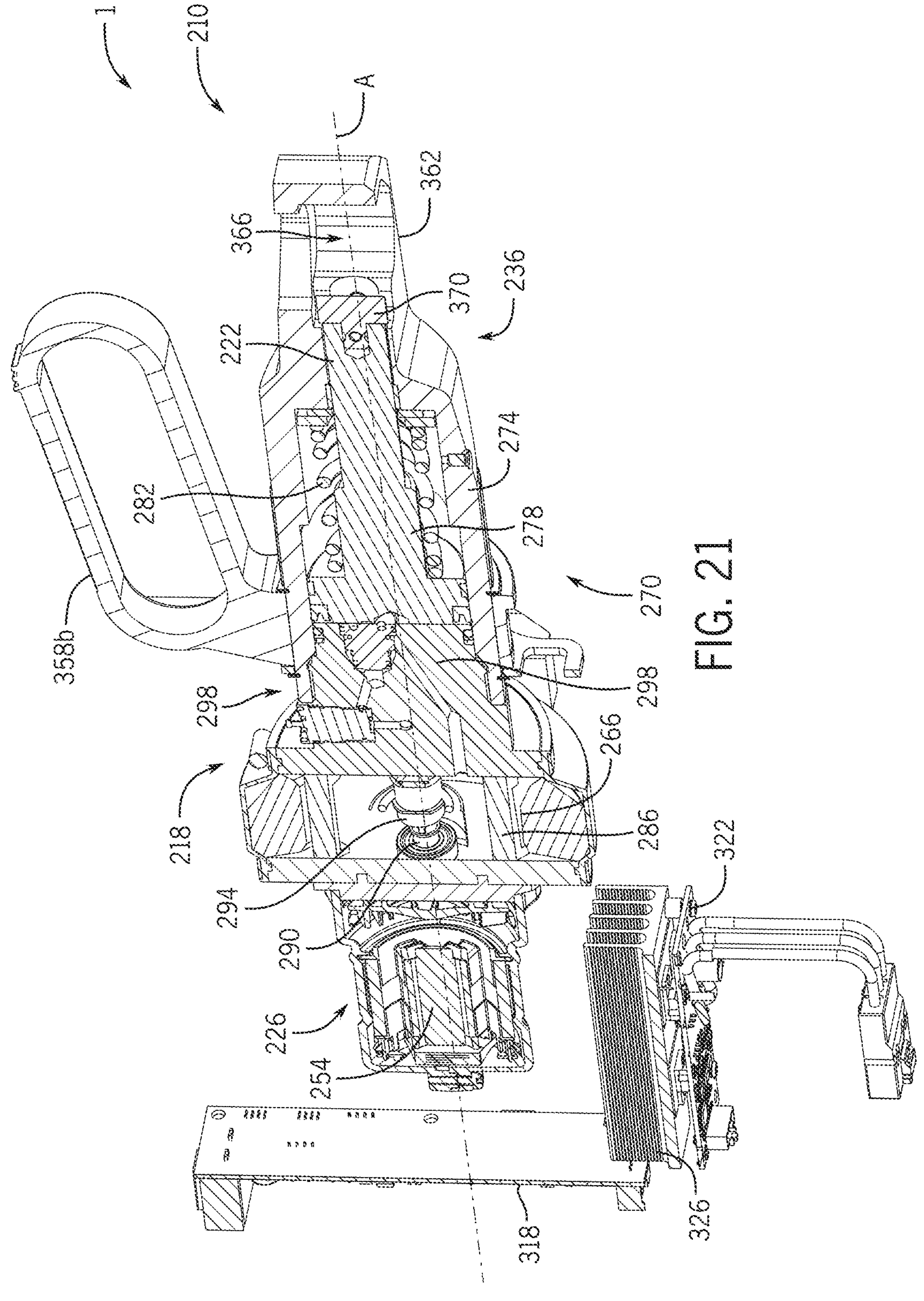
FIG. 21 is a perspective cross-sectional view of the splitter of FIG. 15, illustrated with the housing and the battery pack removed.
Figure 23:
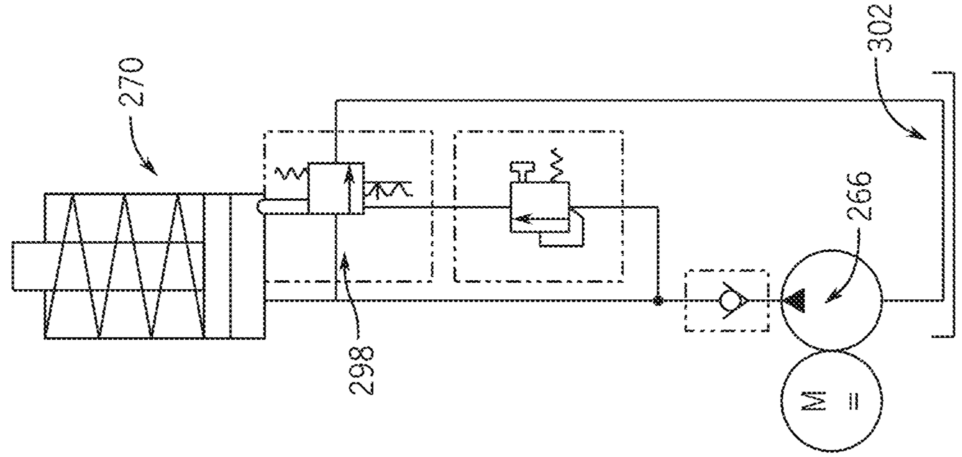
FIG. 23 is a hydraulic circuit diagram of the splitter of FIG. 15.
Figure 22:
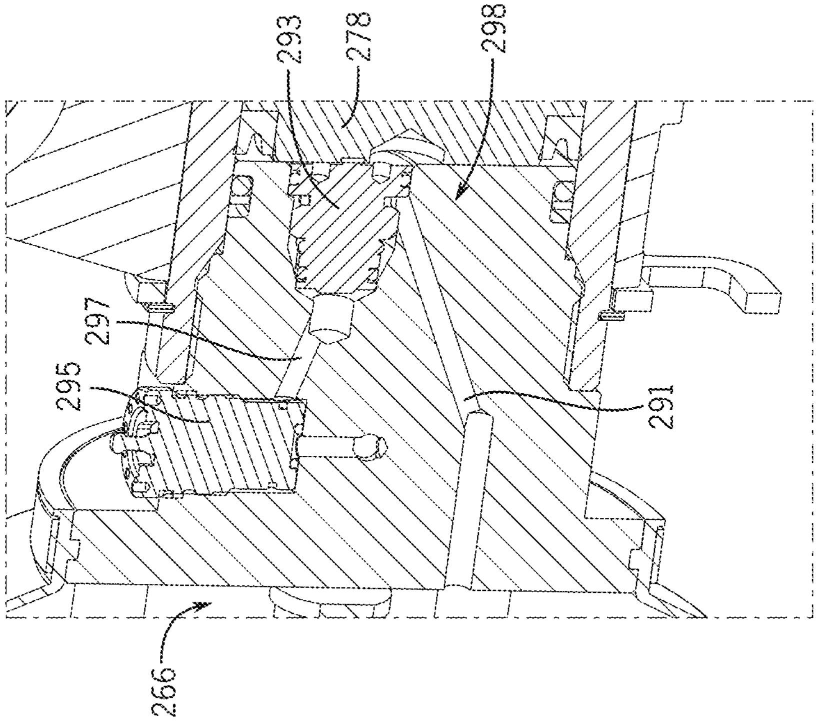
FIG. 22 is a cross-sectional view of an enlarged portion of the splitter as shown in FIG. 21.
Figure 24:
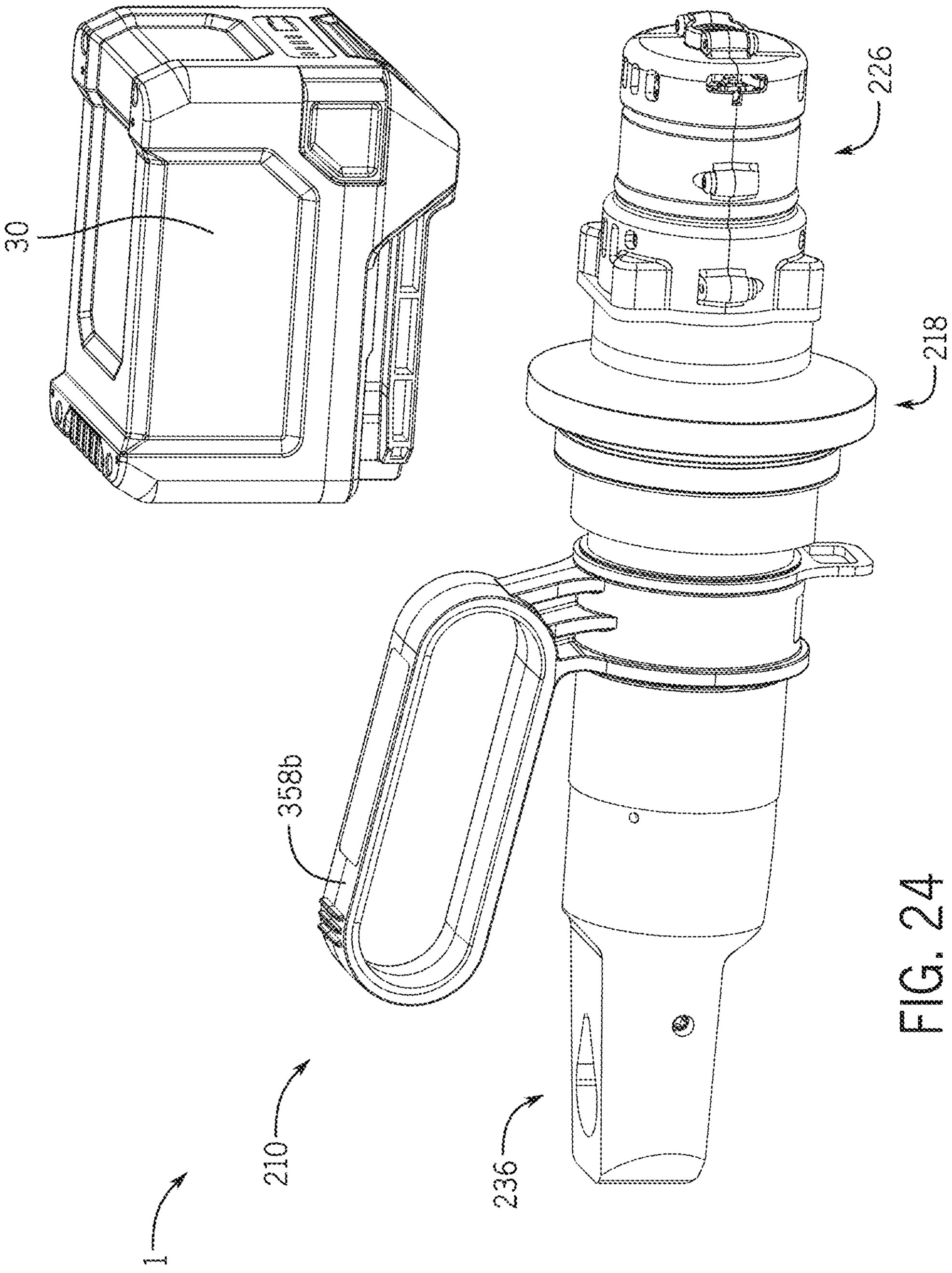
FIG. 24 is a perspective view of the splitter of FIG. 15, illustrated with the housing removed and with transparent components.
Figure 25:
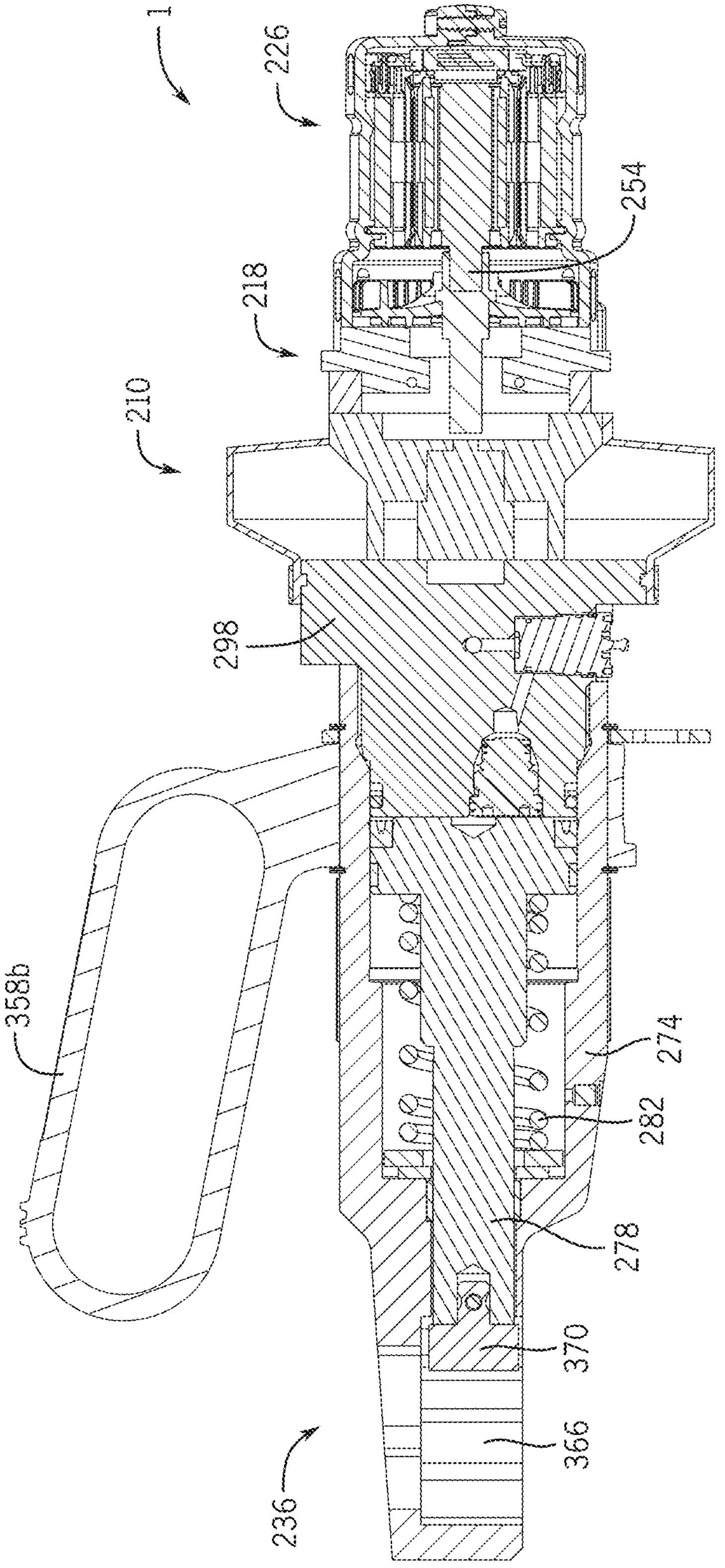
FIG. 25 is a cross-sectional view of the splitter of FIG. 15, illustrated with the housing removed.

With reference to FIGS. 21-23, the hydraulic drive mechanism 218 includes a pump 266 driven by the motor 226 and a piston and cylinder assembly 270. The illustrated drive mechanism 218 is a micro-hydraulic drive mechanism (e.g., with components having a nominal width up to about 3 mm, a flow rate of up to about 201/min, and a pressure output of up to about 300 bar). In the illustrated construction, the drive mechanism 218 provides a maximum flow rate of about 0.3 l/min.

The piston and cylinder assembly 270 includes a cylinder 274 and an extensible piston 278 disposed within the cylinder 274 and connected to the splitter spindle 222. In the illustrated construction, the splitter spindle 222 is provided by an end of the piston 278. The pump 266 provides pressurized hydraulic fluid to the cylinder 274 causing the piston 278 to extend relative to the cylinder 274. Specifically, in the illustrated construction, the piston 278 (along with the splitter spindle 222) is movable from a retracted position to an extended position relative to the cylinder 274 as a result of pressurized fluid supplied by the pump 266. Advantageously, the hydraulic fluid remains inside the housing 14 when being supplied from the pump 266 to the piston 278 (which applies to the other hydraulic tools 1 disclosed herein as well).

A biasing member (e.g., a spring 282) is operable to return the piston 278 and the splitter spindle 222 to the retracted position. In other constructions (not shown), the piston and cylinder assembly 270 may include a double-acting assembly with hydraulic fluid causing retraction of the piston 278 and the splitter spindle 222.

The illustrated pump 266 includes a pump block 286 supporting a rotating pump shaft 290, driven by the motor shaft 254. A number of (e.g., one shown in FIG. 36) reciprocating pump pistons 294, supported by the pump block 286, are driven by the pump shaft 290. In other constructions (not shown), the pump 266 may include more than one pump piston 294.

A valve assembly 298 is operable to control the flow of hydraulic fluid from the pump 266 to the cylinder 274 to control extension of the piston 278. The valve assembly 298 includes a pressure return line 291 (to reservoir), conventional valves 293, 295, and a connection line 297 therebetween. By way of example, Hawe produces a valve assembly (part number SK 8047 110) that could be used as the valve assembly 298. The splitter 210 also includes a reservoir 302 (schematically illustrated in FIG. 23) for containing hydraulic fluid.

Figure 17:
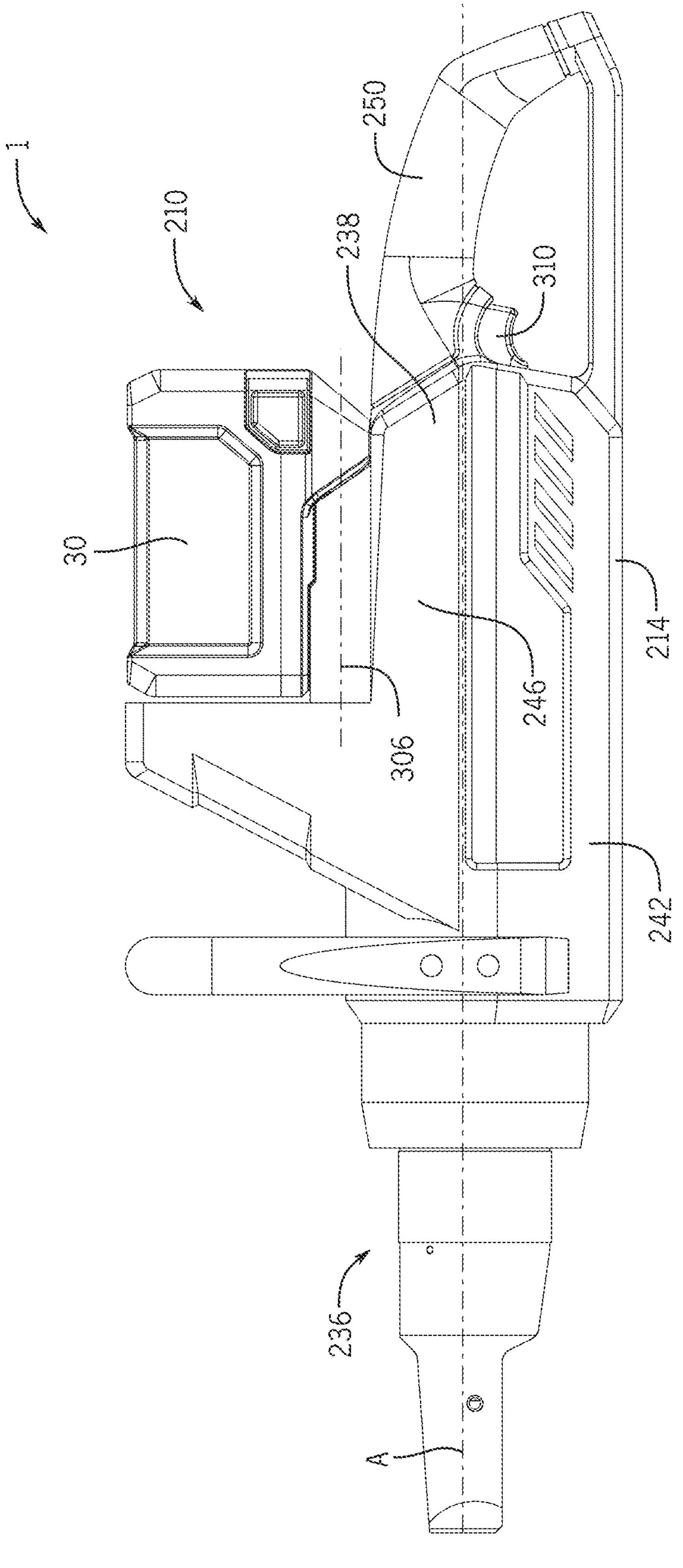
FIG. 17 is a side view of the splitter of FIG. 15.
Figure 18:
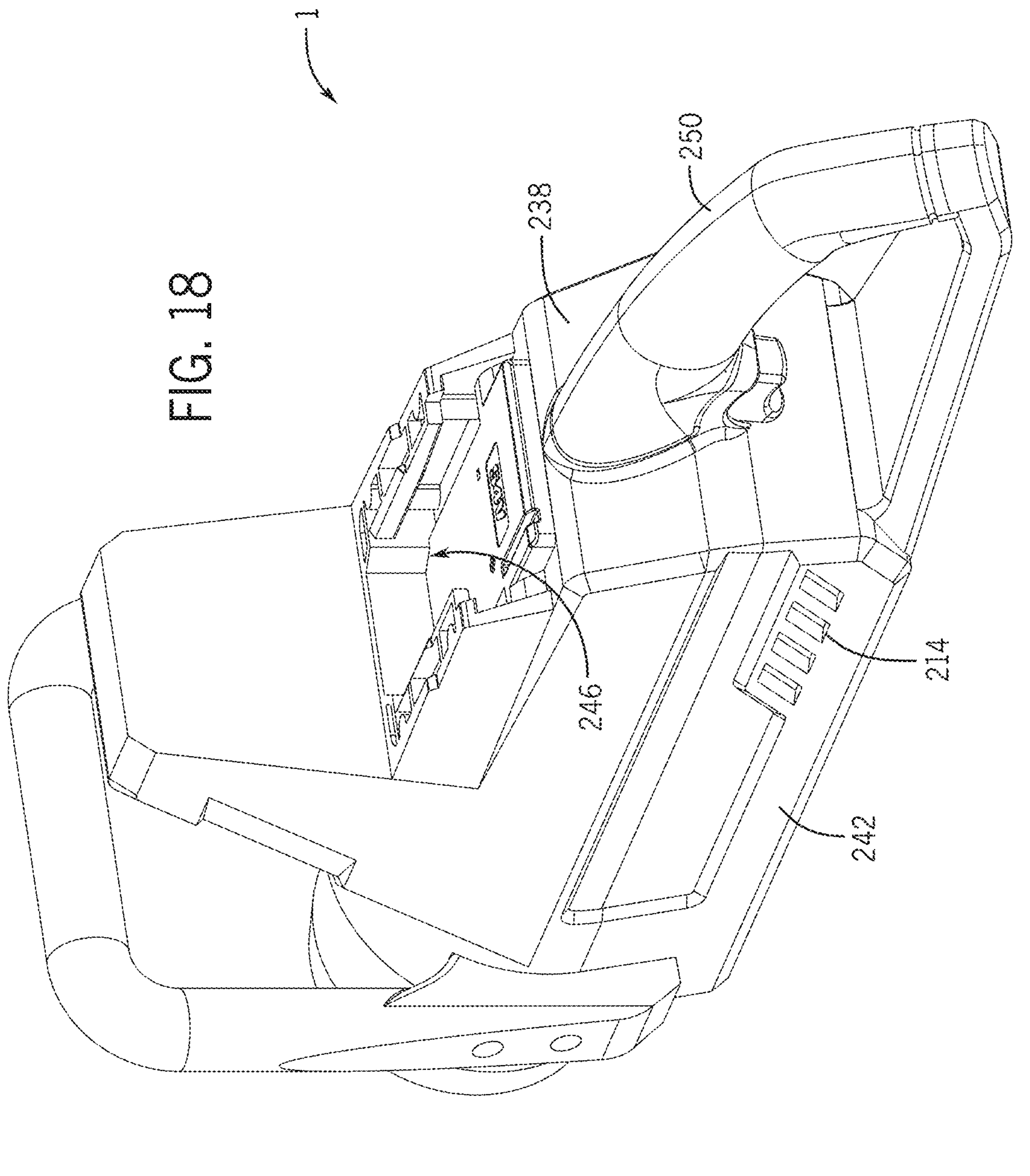
FIG. 18 is a rear perspective view of the splitter of FIG. 15, illustrated with the battery pack removed.

As shown in FIGS. 17-18, the battery pack interface 246 is on the motor housing portion 238 and removably supports the battery pack 30. As illustrated, the interface 246 is oriented to receive the battery pack 30 along an insertion axis 306 oriented parallel to the axis A. Alternatively, the insertion axis 306 may be perpendicular or oblique to the axis A.

An actuator or trigger 310 for operating the splitter 210 is provided on the handle portion 250 and controls operation of the motor 226 (e.g., via a switch (not shown)) and, thereby, operation of the hydraulic drive mechanism 218. Electronic control and monitoring circuitry (e.g., including an electronic processor (not shown)) are operable to control and/or monitor various functions and operations of the splitter 210.

As shown in FIGS. 19-22, a controller 314 is supported in the housing 214 and configured to control operation of the splitter 210 and its components. The controller 314 includes an electronic processor (not shown) mounted on a printed circuit board (PCB) providing a main control board 318 for the splitter 210. As illustrated, the main control board 318 is positioned in the motor housing portion 238. In other constructions (see, e.g., FIG. 20), the control board 318 may be positioned in other orientations/locations in the housing 214 based on factors such as weight (e.g., through material placement/removal), balance, ergonomics, fit, heat management, etc.

A motor driver control board 322 is supported in the motor housing portion 238 and is in communication with the main control board 318. A heat sink 326 is supported on the motor control board 322. Heat from the heat sink 326 and the motor control board 322 is vented through the vents in the motor housing portion 238 and away from the handle portion 250 and the operator.

The splitter 210 may include one or more sensors (not shown) operable to sense a characteristic of the splitter 210. For example, the sensors may include a motor sensor, a movement sensor, a temperature sensor, etc. The controller 314 is connected to and communicates with (e.g., receives measurement signals from) the sensor(s).

The splitter 210 may include an operator interface (not shown) positioned on the housing 214 or on a remote control device (not shown) and operable to communicate information and instructions to/from the operator. The operator interface may include an input device (e.g., one or more buttons, keys, a touch screen, etc.) and an output device (e.g., a display) configured to display conditions or data associated with the splitter 210.

Figures 26A, 26B, 26C:
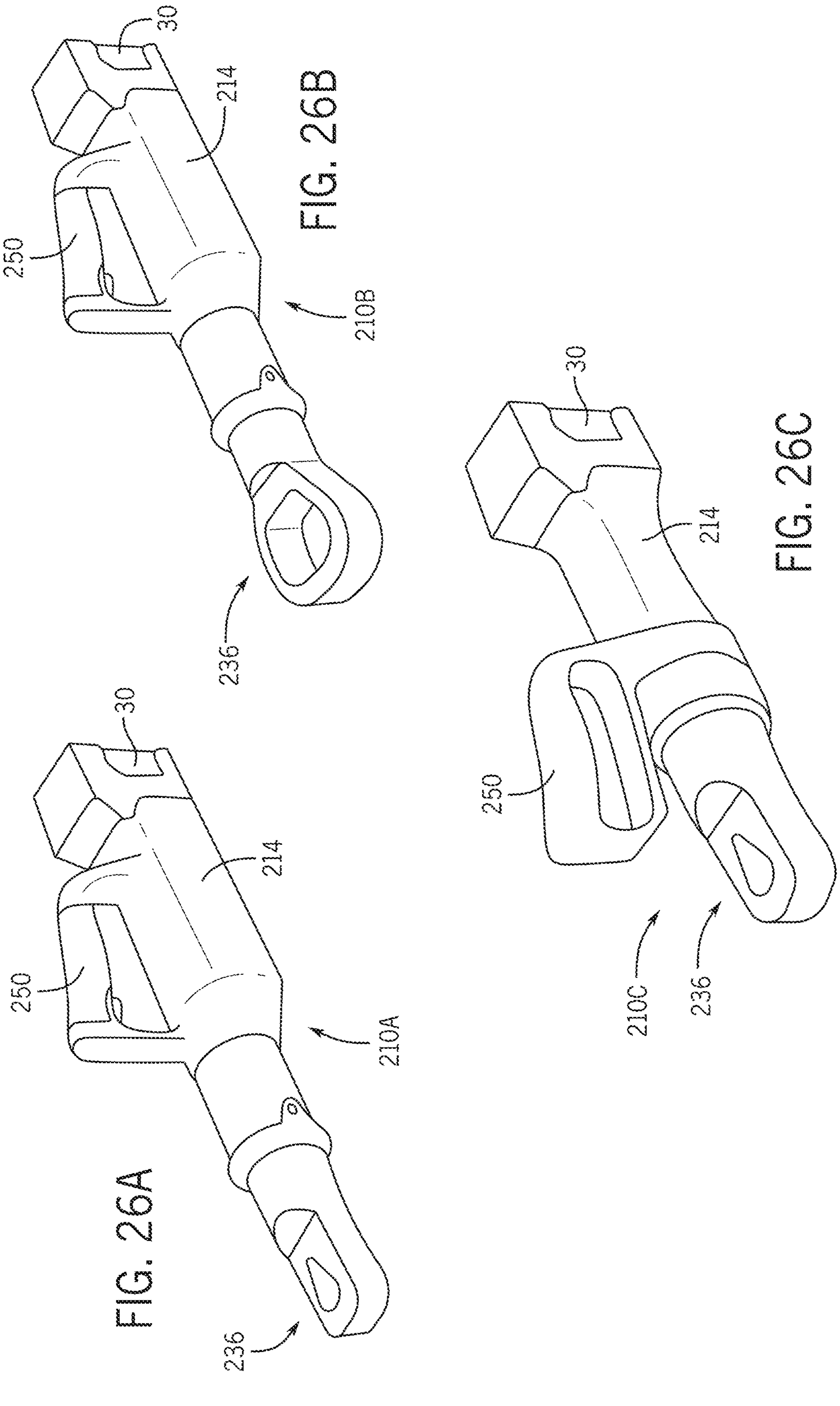
FIGS. 26A-26C are perspective views of additional examples of splitters.
Figure 27:
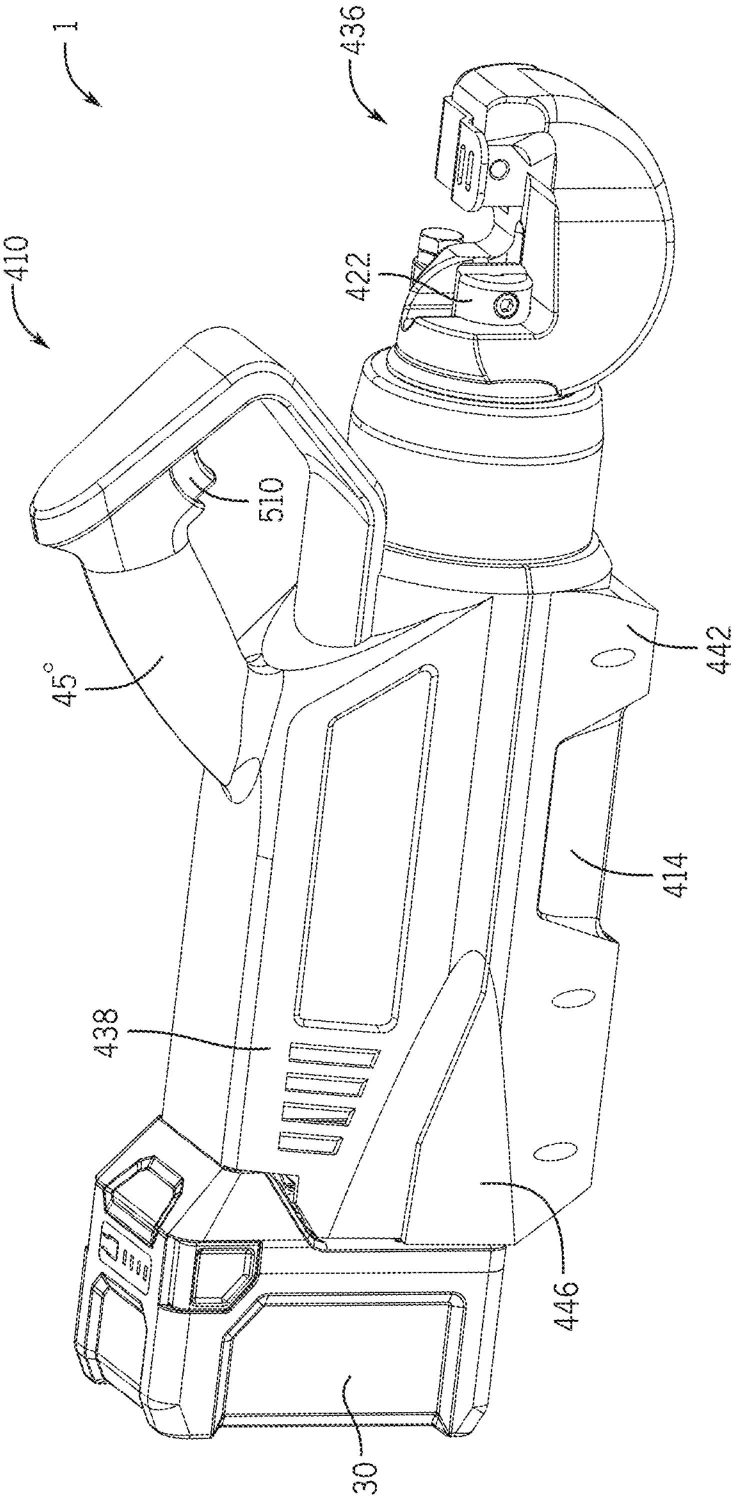
FIG. 27 is a front perspective view of the cutter shown in FIGS. 1A and 1D.
Figure 28:
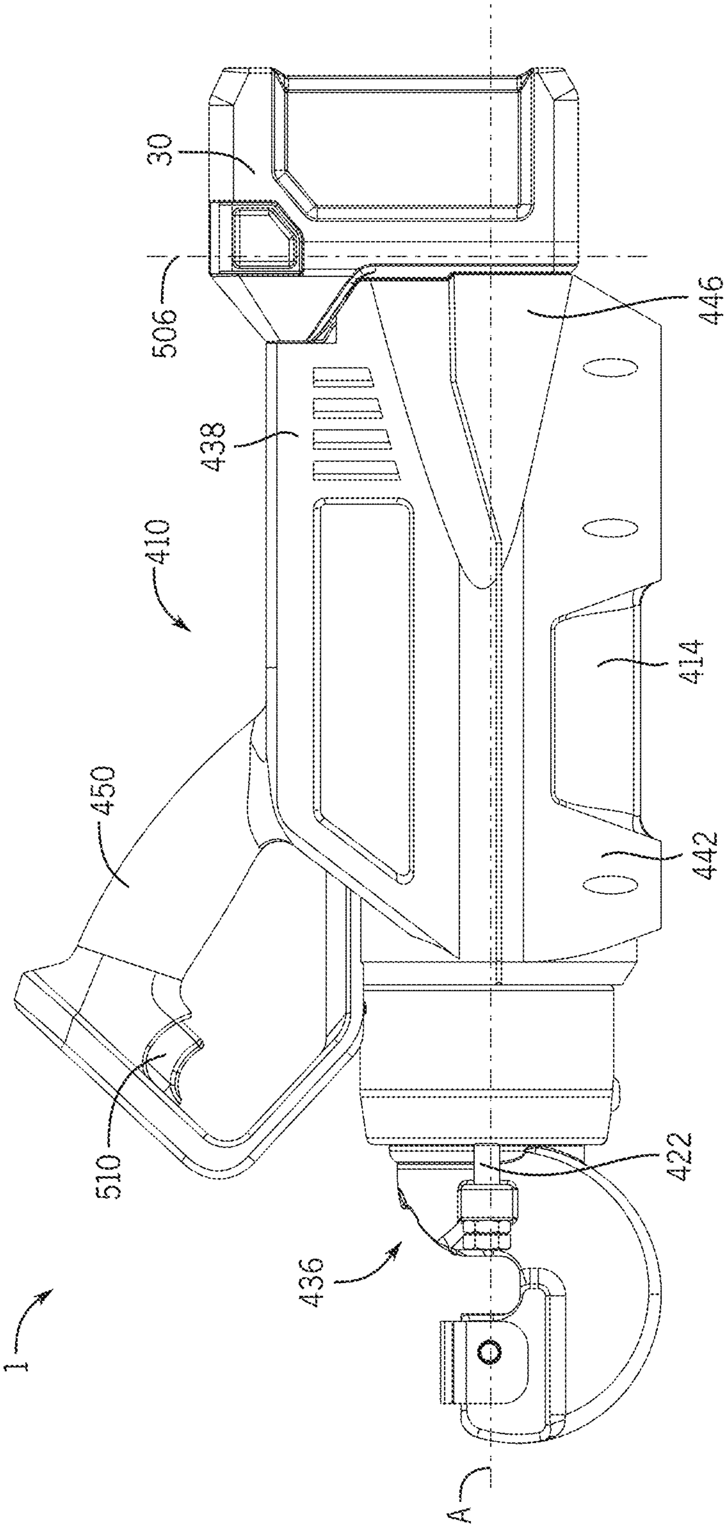
FIG. 28 is a side view of the cutter of FIG. 27.
Figure 29:
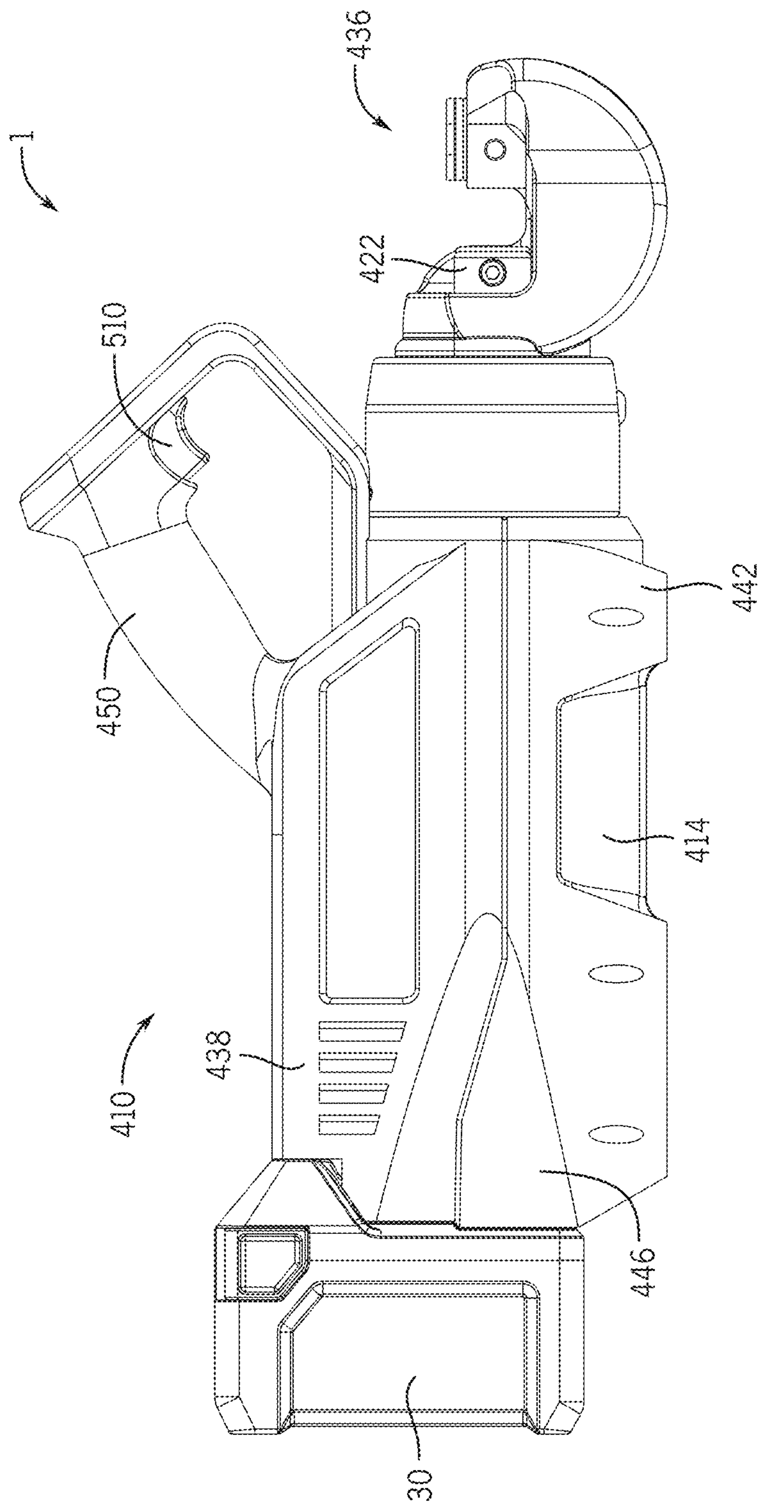
FIG. 29 is another side view of the cutter of FIG. 27.

The illustrated splitter head assembly 236 may be similar to the hydraulic nut splitters sold by Enerpac Tool Group Corp. such as, for example, the 150 kilonewton (kN) capacity, hexagon opening up to 32 mm hydraulic nut splitter, Model No. NSH2432. In other constructions (see, e.g., FIGS. 26A-26C), the splitter 210A, 210B, 210C may include a splitter head assembly 236 having a different size, opening shape and/or capacity. Information on the Enerpac hydraulic nut splitters is hereby incorporated by reference.

Returning to FIGS. 19-21, the splitter head assembly 236 includes a body 362 supporting the splitter spindle 222 for reciprocating movement and defining an opening 366 for receiving a nut (not shown) to be split. A removable and replaceable splitting blade 370 is supported on the end of the splitter spindle 222. The splitter 210 includes an auxiliary handle 358*a*, illustrated as being connected to the drive mechanism portion 242. In some constructions (see FIG. 36), in addition to or alternatively, an auxiliary handle 358*b* is connected to the splitter head assembly 236 (e.g., to the body 362).

To use the splitter 210, a battery pack 30 with sufficient capacity and voltage is connected to the battery interface 246. The nut to be split is positioned in the opening 366. The splitter spindle 222 is advanced to engage the blade 370 with the nut.

With the splitter 210 in position and engaged with the nut, the operator engages the handle portion 250 and, if provided, the auxiliary handle 358*a*, 358*b* to support and control the splitter 210 in a stable, comfortable and/or convenient manner during the splitting operation.

The operator engages the trigger 310 to operate the motor 226 and the hydraulic drive mechanism 218. With the body 362 holding the nut in position, the piston 278 and the splitter spindle 222 are extended so that the splitting blade 370 splits the nut. In the illustrated construction, the splitter spindle 222 and the splitting blade 370 advance at a rate of about 2 mm/s to provide a cycle time of about 10 s to about 12 s (e.g., about 11 s).

When the splitting operation is completed, the split nut is retained in the opening 366. The operator releases the trigger 310 to stop operation of the motor 226 and the pump 266. With hydraulic pressure reduced, the valve assembly 298 removes the pressure acting on the piston 278. In the illustrated construction, the spring 282 applies a force to return the piston 278 and the splitter spindle 222 to the retracted position. The splitter 210 may then be positioned for another splitting operation. As the splitter 210 is repositioned on workpieces, the operator grasps the handle portion 250 and, if provided, the auxiliary handle(s) 358*a*, 358*b*.

FIGS. 27-34 illustrate constructions of another type of hydraulic tool 1 according to the present disclosure, particularly hydraulic cutters 410. Components of the cutter 410 are similar to components of the puller 10 or to the nut splitter 210 described above. Similar features have the same reference number plus "400".

Referring to FIGS. 27-30, the illustrated cutter 410 generally includes a housing 414, and, supported by the housing 414 (see FIGS. 54-55), a hydraulic drive mechanism 418 for driving a cutter spindle 422 along an axis A, a motor 426 for powering the drive mechanism 418, a power source (e.g., a battery pack 30) to power the motor 426, and a cutter head assembly 436.

The housing 414 generally includes a motor housing portion 438, a drive mechanism portion 442, a battery pack interface 446, and a handle portion 450 configured to be gripped by an operator to control operation of the cutter 410. The illustrated motor housing portion 438 supports the motor 426. In the illustrated construction, the motor 426 is an electric motor having a motor shaft 454 extending along the axis A; however, in other constructions (not shown), a different type of motor may be provided.

The drive mechanism portion 442 supports the drive mechanism 418. The illustrated drive mechanism portion 442 is between the motor housing portion 438 and the cutter head assembly 436. The handle portion 450 extends from the drive mechanism portion 442 proximate the cutter head assembly 436 and opposite the battery pack 30. The handle portion 450 defines a grip portion extending at an angle of about 45° to the axis A. In other constructions (not shown), the grip portion may extend at another angle (e.g., parallel to, perpendicular to, etc.) relative to the axis A.

Figure 30:
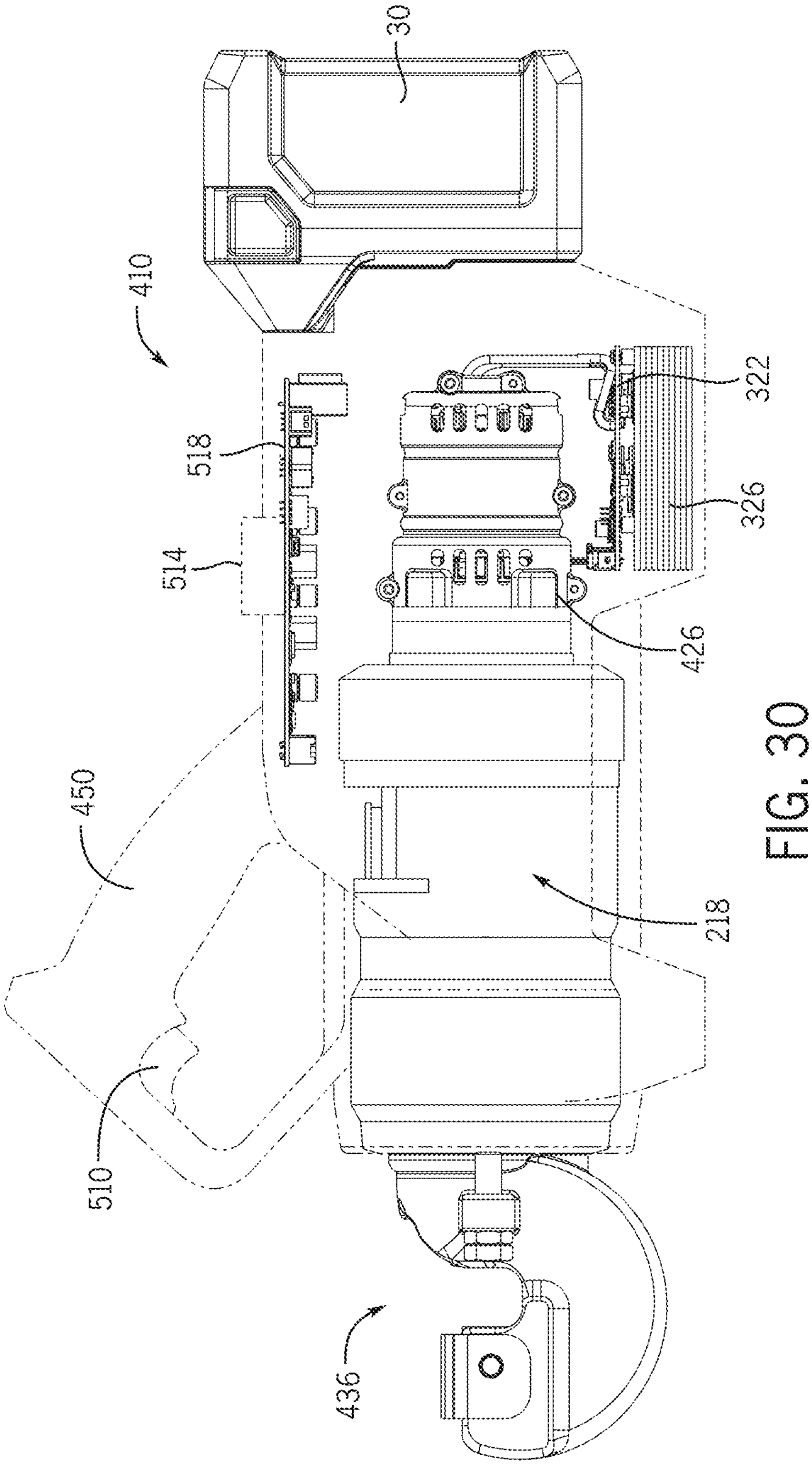
FIG. 30 is a side view of the cutter of FIG. 27, illustrated with the housing transparent.
Figure 31:
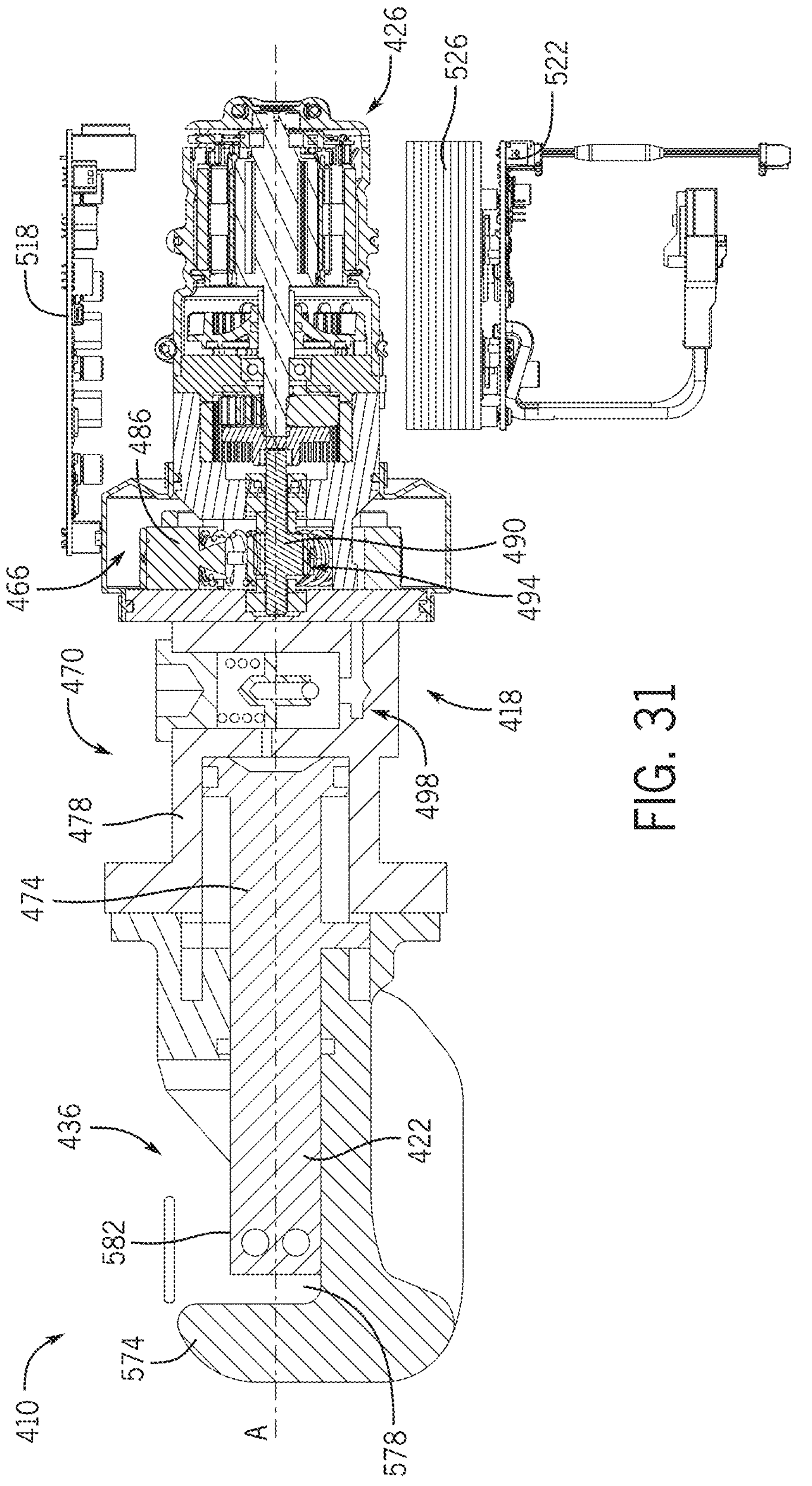
FIG. 31 is a cross-sectional view of the cutter of FIG. 27, illustrated with the housing removed.

With reference to FIGS. 30-31, the hydraulic drive mechanism 418 includes a pump 466 driven by the motor 426 and a piston and cylinder assembly 470. The illustrated drive mechanism 418 is a micro-hydraulic drive mechanism (e.g., with components having a nominal width up to about 3 mm, a flow rate of up to about 201/min, and a pressure output of up to about 300 bar).

The piston and cylinder assembly 470 includes a cylinder 474 and an extensible piston 478 disposed within the cylinder 474 and connected to the cutter spindle 422. In the illustrated construction, the cutter spindle 422 is provided by an end of the piston 478. The pump 466 provides pressurized hydraulic fluid to the cylinder 474 causing the piston 478 to extend relative to the cylinder 474. Specifically, in the illustrated construction, the piston 478 (along with the cutter spindle 422) is movable from a retracted position to an extended position relative to the cylinder 474 as a result of pressurized fluid supplied by the pump 466.

In the illustrated construction, the piston and cylinder assembly 470 includes a double-acting assembly with hydraulic fluid causing retraction of the piston 478 and the cutter spindle 422. In other constructions (not shown), another mechanism (e.g., a biasing member) may provide a force to retract the piston 478 and the cutter spindle 422.

The illustrated pump 466 includes a pump block 486 supporting a rotating pump shaft 490, driven by the motor shaft 454. A number of (e.g., three; one shown in FIG. 55) reciprocating pump pistons 494, supported by the pump block 486, are driven by the pump shaft 490. A valve assembly 498 is operable to control the flow of hydraulic fluid from the pump 466 to the cylinder 474 to control extension and retraction of the piston 478. The cutter 410 also includes a reservoir (not shown) for containing hydraulic fluid.

Figure 32:
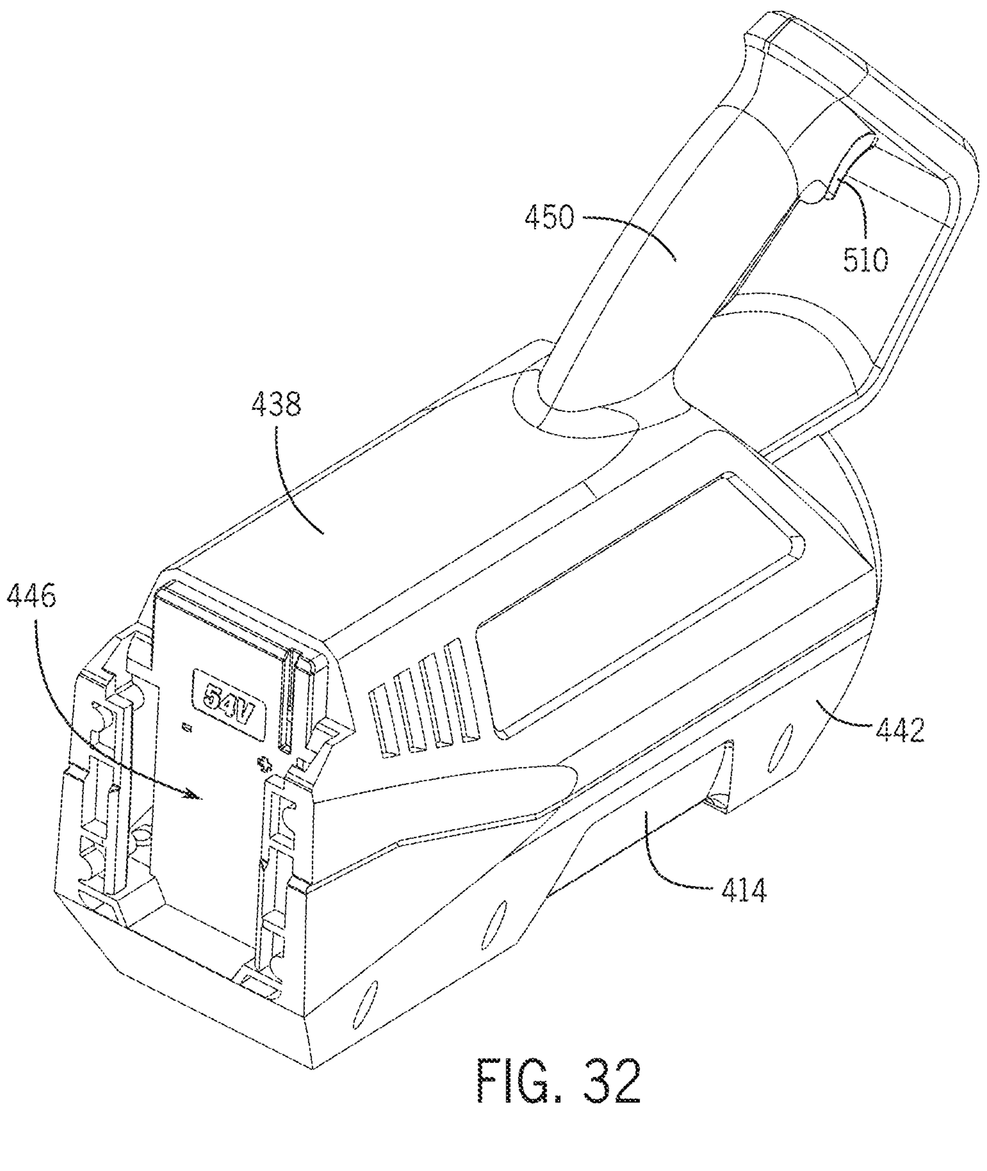
FIG. 32 is a rear perspective view of the housing of the cutter of FIG. 27.
Figure 34:
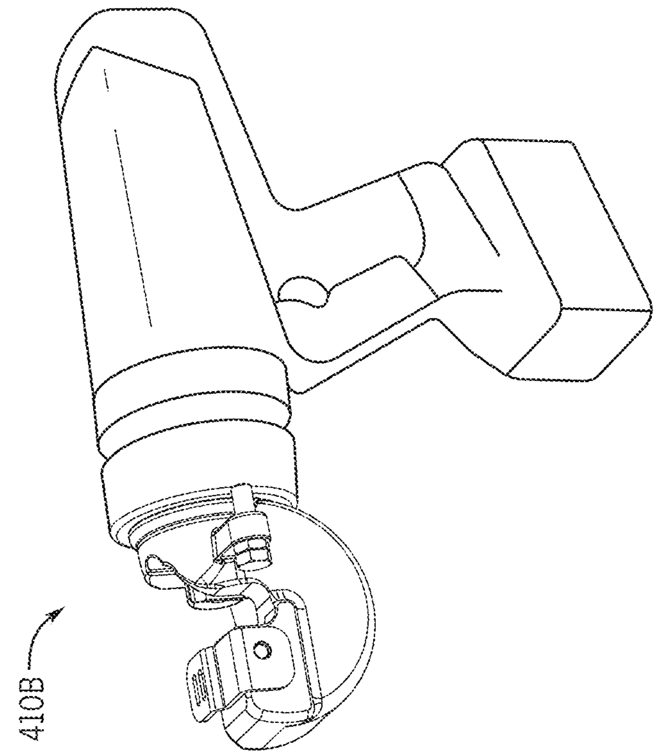
FIG. 34 is a perspective view of another example of a cutter.
Figure 33:
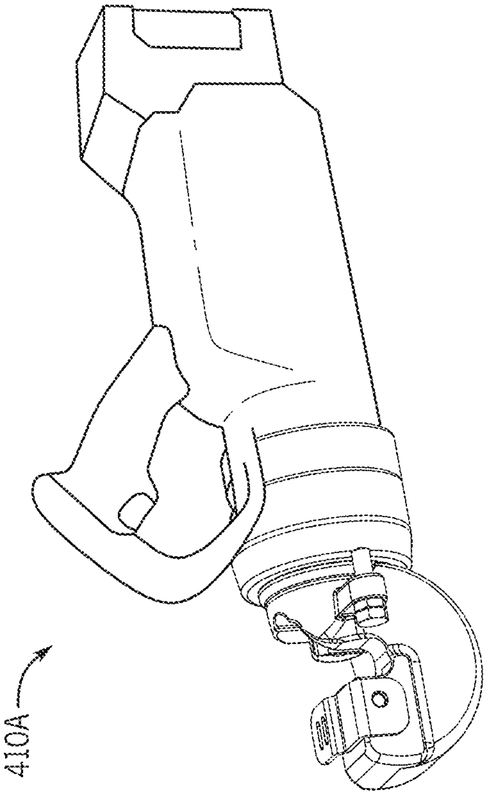
FIG. 33 is a perspective view of another example of a cutter.

As shown in FIG. 32, the battery pack interface 446 is on an end of the motor housing portion 438 opposite the cutter head assembly 436. The battery pack interface 446 removably supports the battery pack 30. As illustrated, the interface 446 is oriented to receive the battery pack 30 along an insertion axis 506 oriented perpendicular to the axis A. Alternatively, the insertion axis 506 may be parallel or oblique to the axis A.

Returning to FIGS. 30-31, an actuator or trigger 510 for operating the cutter 410 is provided on the handle portion 450 and controls operation of the motor 426 (e.g., via a switch (not shown)) and, thereby, operation of the hydraulic drive mechanism 418. The handle portion 450 and the trigger 510 extend over the drive mechanism 418 and toward the cutter head assembly 436. Electronic control and monitoring circuitry (e.g., including an electronic processor (not shown)) are operable to control and/or monitor various functions and operations of the cutter 410. A controller 514 (schematically illustrated in FIG. 55), supported in the housing 414, is configured to control operation of the cutter 410 and its components. The controller 514 includes an electronic processor (not shown) mounted on a printed circuit board (PCB) providing a main control board 518 for the cutter 410. As illustrated, the main control board 518 is positioned in the motor housing portion 438. In other constructions (not shown), the control board 518 may be positioned in other orientations/locations in the housing 414 based on factors such as weight (e.g., through material placement/removal), balance, ergonomics, fit, heat management, etc.

A motor driver control board 522 is supported in the motor housing portion 438 and is in communication with the main control board 518. A heat sink 526 is supported on the motor control board 522. Heat from the heat sink 526 and the motor control board 522 is vented through the vents in the motor housing portion 438 and away from the handle portion 450 and the operator.

The cutter 410 may include one or more sensors (not shown) operable to sense a characteristic of the cutter 410. For example, the sensors may include a motor sensor, a movement sensor, a temperature sensor, etc. The controller 514 is connected to and communicates with (e.g., receives measurement signals from) the sensor(s).

The cutter 410 may include an operator interface (not shown) positioned on the housing 414 or on a remote control device (not shown) and operable to communicate information and instructions to/from the operator. The operator interface may include an input device (e.g., one or more buttons, keys, a touch screen, etc.) and an output device (e.g., a display) configured to display conditions or data associated with the cutter 410.

With continued reference to FIGS. 30-31, a cutter head assembly 436 includes a body 574 supporting the cutter spindle 422 for reciprocating movement and defining an opening 578 for receiving a strand (not shown) to be cut. A removable and replaceable cutting blade 582 is supported on the end of the cutter spindle 422. The cutter 410 may include an auxiliary handle (not shown).

To use the cutter 410, a battery pack 30 with sufficient capacity and voltage is connected to the battery interface 446. The strand to be cut is positioned in the opening 578. The cutter spindle 422 is advanced to engage the blade 582 with the strand. With the cutter 410 in position and engaged with the strand, the operator engages the handle portion 450 and, if provided, the auxiliary handle to support and control the cutter 410 in a stable, comfortable and/or convenient manner during the cutting operation. The operator engages the trigger 510 to operate the motor 426 and the hydraulic drive mechanism 418. With the body 574 holding the strand in position, the piston 478 and the cutter spindle 422 are extended so that the cutting blade 584 cuts the strand. In the illustrated construction, the cycle time of about 5 s to about 7 s (e.g., about 6.5 s).

When the cutting operation is completed, the operator releases to trigger 510, and the valve assembly 498 operates to cause the flow of hydraulic fluid to return the piston 478 and the cutter spindle 422 to the retracted position. The cutter 410 may then be positioned for another cutting operation. As the cutter 410 is repositioned on workpieces, the operator grasps the handle portion 450 and, if provided, the auxiliary handle.

In contrast to operation of conventional hydraulic tools using a separate pump which require two operators, only one operator is needed for the puller 10, the nut splitter 210, the cutter 410 with an onboard hydraulic drive mechanism 18, 218, 418 and power source (battery pack 30). The onboard hydraulic drive mechanism 18, 218, 418 and the onboard battery pack 30 allows an operator to conveniently transport the hydraulic tool to/from and around a work area and to operate the hydraulic tool in work area with limited access to electrical power and/or pneumatics.

In certain embodiments, the tools disclosed above are sized and powered so as to be capable of performing the intended task, without more. This means that the size and weight of each tool can be minimized as much as possible, improving ergonomics and the ease of completing the job.

This written description uses examples to disclose the invention, including the best mode, and also to enable any person skilled in the art to make and use the invention. Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A hydraulic tool for working on a workpiece, the hydraulic tool comprising:
- a housing configured to be held by an operator;
- a motor positioned in the housing;
- a battery supported by the housing and operable to supply power to the motor;
- a drive mechanism supported by the housing, the drive mechanisms comprising a cylinder, a piston moveably supported in the cylinder, and a pump powered by the motor and operable to supply hydraulic fluid to the cylinder to move the piston relative to the cylinder;
- a jaw member supported by the housing and configured to engage with the workpiece; and
- a spindle operatively coupled to the drive mechanism such that operating the drive mechanism moves the spindle in an axial direction to move part of the workpiece in the axial direction relative to the jaw member to work on the workpiece.

2. The hydraulic tool according to claim 1, wherein the spindle is coupled to the piston.

3. The hydraulic tool according to claim 1, wherein the jaw member comprises two jaw members each extending between a first end supported by the housing and a second end for engaging the workpiece, and wherein a distance between the second ends is adjustable to accommodate different configurations for the workpiece.

4. The hydraulic tool according to claim 3, wherein the drive mechanism moves the spindle in an axial direction, and wherein the distance between the second ends of the two jaw members are adjustable in a radial direction that is perpendicular to the axial direction.

5. The hydraulic tool according to claim 3, wherein the two jaw members are pivotally coupled to the housing, and wherein pivoting the two jaw members adjusts the distance between the second ends thereof.

6. The hydraulic tool according to claim 1, wherein the drive mechanism moves the spindle in an axial direction, and wherein the axial position of the spindle relative to the piston is adjustable to accommodate different configurations for the workpiece.

7. The hydraulic tool according to claim 6, wherein the housing extends in the axial direction between a front and a back, wherein the jaw member is supported closer to the front than to the back of the housing, and wherein the spindle extends out the back of the housing for adjusting the axial position of the spindle relative to the piston.

8. The hydraulic tool according to claim 6, wherein the spindle is threadingly coupled to the piston.

9. The hydraulic tool according to claim 6, further comprising a sleeve moveable by the piston, and wherein the spindle telescopes relative to the sleeve to adjust the axial position of the spindle relative to the piston.

10. The hydraulic tool according to claim 1, further comprising a hollow member through which the spindle extends, wherein the hollow member is supported by the housing, and wherein the jaw member is supported on an outer surface of the hollow member.

11. The hydraulic tool according to claim 10, wherein the jaw member is pivotably supported on the outer surface of the hollow member via a first collar, further comprising a second collar that is supported on an outer surface of the first collar, and further comprising a linkage that couples the jaw member to the second collar such that adjusting an axial position of the second collar along the hollow member pivots the jaw member to accommodate for different configurations of the workpiece.

12. The hydraulic tool according to claim 11, further comprising a nut that engages with threads on the outer surface of the hollow member, wherein axial moving the nut along the threads of the hollow member adjusts the position of the collar to pivot the jaw member.

13. The hydraulic tool according to claim 10, wherein the jaw member freely rotates about the outer surface of the hollow member.

14. The hydraulic tool according to claim 10, wherein the jaw member is pivotably supported on the outer surface of the hollow member via a first collar, wherein an axial position of the collar along the outer surface of the hollow member is fixed.

15. The hydraulic tool according to claim 1, wherein the hydraulic fluid remains inside the housing when being supplied from the pump to the piston.

16. The hydraulic tool according to claim 1, wherein the housing includes a pistol grip configured to be held by the operator, and further comprising a switch supported operable by the operator to operate the drive mechanism.

17. A hydraulic tool according to claim 1, wherein the piston is moveable along a piston axis, wherein the spindle extends along a spindle axis, and wherein the piston axis is substantially coaxial with the spindle axis.

18. The hydraulic tool according to claim 1, wherein the pump comprises a block supporting a rotating pump shaft and a reciprocating pump piston, whereby the rotation of the pump shaft causing reciprocation of the pump piston transfers the hydraulic fluid to the cylinder.

19. A hydraulic tool for working on a workpiece, the hydraulic tool comprising:

a housing configured to be held by an operator:

a motor positioned in the housing:

a battery supported by the housing and operable to supply power to the motor:

a drive mechanism supported by the housing, the drive mechanisms comprising a cylinder, a piston moveably supported in the cylinder, and a pump powered by the motor and operable to supply hydraulic fluid to the cylinder to move the piston relative to the cylinder;

a jaw member supported by the housing and configured to engage with the workpiece; and a spindle operatively coupled to the drive mechanism such that operating the drive mechanism moves the spindle relative to the jaw member to work on the workpiece, wherein operating the drive mechanism causes the piston to move the spindle while the jaw member remains stationary.

20. A hydraulic tool for working on a workpiece, the hydraulic tool comprising:

a housing configured to be held by an operator;

a motor positioned in the housing;

a battery supported by the housing and operable to supply power to the motor;

a drive mechanism supported by the housing. the drive mechanisms comprising a cylinder, a piston moveably supported in the cylinder. and a pump powered by the motor and operable to supply hydraulic fluid to the cylinder to move the piston relative to the cylinder:

a jaw member supported by the housing and configured to engage with the workpiece; and a spindle operatively coupled to the drive mechanism such that operating the drive mechanism moves the spindle relative to the jaw member to work on the workpiece. wherein the hydraulic tool is a bearing puller.

* * * * *